(12) United States Patent
Yang

(10) Patent No.: US 10,901,183 B2
(45) Date of Patent: Jan. 26, 2021

(54) OPTICAL PHOTOGRAPHING LENS ASSEMBLY, IMAGE CAPTURING UNIT AND ELECTRONIC DEVICE

(71) Applicant: LARGAN PRECISION CO.,LTD., Taichung (TW)

(72) Inventor: Shu-Yun Yang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 271 days.

(21) Appl. No.: 16/047,195

(22) Filed: Jul. 27, 2018

(65) Prior Publication Data

US 2019/0227279 A1    Jul. 25, 2019

(30) Foreign Application Priority Data

Jan. 19, 2018   (TW) .............................. 107101948 A

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .......... G02B 9/64; G02B 5/005; G02B 5/208; G02B 7/04; G02B 13/0045; G02B 13/04; G02B 13/18
See application file for complete search history.

(56) References Cited

U.S. PATENT DOCUMENTS

| 4,867,546 A | 9/1989 | Nishioka et al. |
| 4,948,238 A | 8/1990 | Araki |
| 5,371,628 A | 12/1994 | Shimoda et al. |
| 6,069,743 A | 5/2000 | Nagata et al. |
| 6,191,896 B1 | 2/2001 | Itoh |
| 6,233,099 B1 | 5/2001 | Itoh |
| 7,633,688 B2 | 12/2009 | Kamo |
| 2012/0212836 A1* | 8/2012 | Hsieh ..................... G02B 13/04 359/708 |
| 2015/0277083 A1 | 10/2015 | Chae |
| 2017/0090157 A1 | 3/2017 | Tang et al. |
| 2017/0131520 A1 | 5/2017 | Tang et al. |

(Continued)

FOREIGN PATENT DOCUMENTS

| CN | 101408664 | 4/2009 |
| CN | 106990510 A | 7/2017 |

(Continued)

OTHER PUBLICATIONS

TW Office Action dated Jun. 29, 2018 in application No. 107101948.

*Primary Examiner* — Joseph P Martinez
*Assistant Examiner* — Vipin Patel
(74) *Attorney, Agent, or Firm* — Maschoff Brennan

(57) ABSTRACT

An optical photographing lens assembly includes seven lens elements which are, in order from an object side to an image side: a first lens element, a second lens element, a third lens element, a fourth lens element, a fifth lens element, a sixth lens element and a seventh lens element. At least one surface among object-side surfaces and image-side surfaces of the seven lens elements is aspheric. At least one of an object-side surface and an image-side surface of the seventh lens element has at least one inflection point.

29 Claims, 22 Drawing Sheets

(56) References Cited

U.S. PATENT DOCUMENTS

| | | | |
|---|---|---|---|
| 2017/0254985 A1* | 9/2017 | Lai | G02B 13/0045 |
| 2017/0285304 A1 | 10/2017 | Lai et al. | |
| 2017/0293116 A1 | 10/2017 | Matsumoto | |
| 2018/0074294 A1* | 3/2018 | Hsueh | G02B 13/0045 |
| 2018/0149835 A1 | 5/2018 | Park | |
| 2018/0180855 A1 | 6/2018 | Balk et al. | |
| 2019/0056569 A1 | 2/2019 | Yoo et al. | |
| 2019/0101728 A1 | 4/2019 | Hsieh et al. | |
| 2019/0129147 A1 | 5/2019 | Huh et al. | |
| 2019/0137736 A1 | 5/2019 | Huh et al. | |
| 2019/0154972 A1 | 5/2019 | Zhang et al. | |
| 2019/0204540 A1 | 7/2019 | Liao et al. | |

FOREIGN PATENT DOCUMENTS

| | | | |
|---|---|---|---|
| CN | 107102425 A | 8/2017 | |
| CN | 108107546 A | 6/2018 | |
| CN | 108107551 A | 6/2018 | |
| CN | 108132524 A | 6/2018 | |
| JP | 2006337691 A | 12/2006 | |
| JP | 2015060201 A | 3/2015 | |
| JP | 2016133599 A | 7/2016 | |
| JP | 2016194653 A | 11/2016 | |
| JP | 2016218242 A | 12/2016 | |
| JP | 2017173807 A | 9/2017 | |
| TW | 201816456 A | 5/2018 | |

* cited by examiner

OPTICAL PHOTOGRAPHING LENS ASSEMBLY, IMAGE CAPTURING UNIT AND ELECTRONIC DEVICE

RELATED APPLICATIONS

This application claims priority to Taiwan Application 107101948, filed on Jan. 19, 2018, which is incorporated by reference herein in its entirety.

BACKGROUND

Technical Field

The present disclosure relates to an optical photographing lens assembly, an image capturing unit and an electronic device, more particularly to an optical photographing lens assembly and an image capturing unit applicable to an electronic device.

Description of Related Art

With the development of semiconductor manufacturing technology, the performance of image sensors has been improved, and the pixel size thereof has been scaled down. Therefore, featuring high image quality is one of the indispensable features of an optical system nowadays.

Furthermore, due to the rapid changes in technology, electronic devices equipped with optical systems are developed towards multi-functionality for various applications, and therefore the functionality requirements for the optical systems have been increasing. However, it is difficult for a conventional optical system to obtain a balance among the requirements such as high image quality, low sensitivity, a desirable size of the aperture, miniaturization or sufficient field of view. Accordingly, the present disclosure provides an optical system satisfying the aforementioned requirements.

SUMMARY

According to one aspect of the present disclosure, an optical photographing lens assembly includes seven lens elements. The seven lens elements are, in order from an object side to an image side, a first lens element, a second lens element, a third lens element, a fourth lens element, a fifth lens element, a sixth lens element and a seventh lens element. At least one surface among object-side surfaces and image-side surfaces of the seven lens elements is aspheric. At least one of an object-side surface and an image-side surface of the seventh lens element has at least one inflection point. When a focal length of the optical photographing lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, a focal length of the i-th lens element is fi, and an axial distance between an object-side surface of the first lens element and an image surface is TL, the following conditions are satisfied:

$\Sigma |f/fi| < 2.20$, wherein $i=1,2,3,4,5,6,7$; and $0.50 < TL/f < 3.50$.

According to another aspect of the present disclosure, an image capturing unit includes the aforementioned optical photographing lens assembly and an image sensor, wherein the image sensor is disposed on the image surface of the optical photographing lens assembly.

According to still another aspect of the present disclosure, an electronic device includes the aforementioned image capturing unit.

According to yet another aspect of the present disclosure, an optical photographing lens assembly includes seven lens elements. The seven lens elements are, in order from an object side to an image side, a first lens element, a second lens element, a third lens element, a fourth lens element, a fifth lens element, a sixth lens element and a seventh lens element. At least one surface among object-side surfaces and image-side surfaces of the seven lens elements is aspheric. The first lens element has positive refractive power. The seventh lens element with negative refractive power has an image-side surface being concave in a paraxial region thereof, and the image-side surface of the seventh lens element has at least one convex shape in an off-axis region thereof. When a focal length of the optical photographing lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, a focal length of the i-th lens element is fi, and a curvature radius of an image-side surface of the fifth lens element is R10, the following conditions are satisfied:

$\Sigma |f/fi| < 2.60$, wherein $i=1,2,3,4,5,6,7$; and $R10/f < 1.30$.

According to yet still another aspect of the present disclosure, an optical photographing lens assembly includes seven lens elements. The seven lens elements are, in order from an object side to an image side, a first lens element, a second lens element, a third lens element, a fourth lens element, a fifth lens element, a sixth lens element and a seventh lens element. At least one surface among object-side surfaces and image-side surfaces of the seven lens elements is aspheric. The first lens element has positive refractive power. The second lens element has negative refractive power. The seventh lens element has an image-side surface being concave in a paraxial region thereof, and the image-side surface of the seventh lens element has at least one convex shape in an off-axis region thereof. When a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, a focal length of the i-th lens element is fi, an axial distance between an object-side surface of the first lens element and the image-side surface of the seventh lens element is TD, and a maximum image height of the optical photographing lens assembly is ImgH, the following conditions are satisfied:

$\Sigma |f/fi| < 2.60$, wherein $i=1,2,3,4,5,6,7$; and $0.50 < TD/ImgH < 5.0$.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
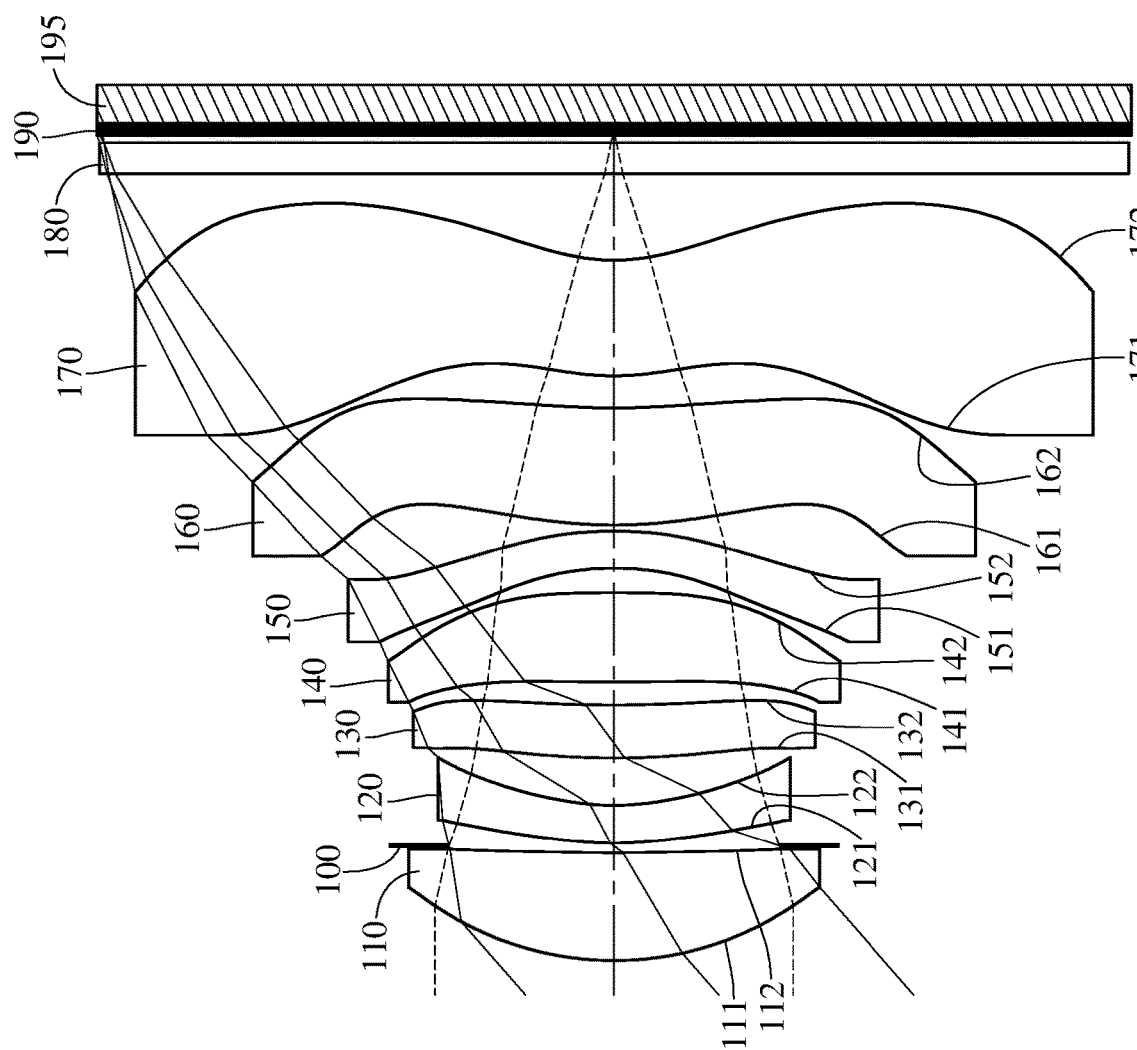
FIG. 1 is a schematic view of an image capturing unit according to the 1st embodiment of the present disclosure.

An optical photographing lens assembly includes seven lens elements. The seven lens elements are, in order from an object side to an image side, a first lens element, a second lens element, a third lens element, a fourth lens element, a fifth lens element, a sixth lens element and a seventh lens element.

There can be an air gap in a paraxial region between every adjacent lens element of the optical photographing lens assembly; that is, each of the first through the seventh lens elements can be a single and non-cemented lens element.

The manufacturing process of cemented lenses is more complex than the non-cemented lenses, particularly when an image-side surface of one lens element and an object-side surface of the following lens element need to have accurate curvatures to ensure both lenses being highly cemented. However, during the cementing process, those two lens elements might not be highly cemented due to misalignment and it is thereby not favorable for the image quality. Therefore, having an air gap in a paraxial region between every adjacent lens element of the optical photographing lens assembly in the present disclosure is favorable for avoiding the problem associated with the cemented lens elements while improving the yield rate.

The first lens element can have positive refractive power; therefore, adjusting the refractive power of the first lens element is favorable for gathering incident light with a large angle of view and reducing spherical aberrations. The first lens element can have an object-side surface being convex in a paraxial region thereof; therefore, controlling the shape of the object-side surface of the first lens element is favorable for reducing the incident angle of light on the first lens element so as to prevent surface reflection. The first lens element can have an image-side surface being concave in a paraxial region thereof; therefore, controlling the image-side surface of the first lens element is favorable for incident light with a large angle of view to travel into the optical photographing lens assembly and further reducing the sensitivity of the optical photographing lens assembly.

The second lens element can have negative refractive power; therefore, adjusting the refractive power of the second lens element is favorable for balancing the refractive power of the first lens element so as to enable sufficient light traveling into the optical photographing lens assembly. The second lens element can have an image-side surface being concave in a paraxial region thereof; therefore, controlling the image-side surface of the second lens element is favorable for correcting chromatic aberration so as to improve image quality.

The third lens element can have an object-side surface being convex in a paraxial region thereof. Therefore, it is favorable for correcting astigmatism so as to further improve image quality.

The fifth lens element can have an object-side surface being concave in a paraxial region thereof; therefore, it is favorable for reducing the incident angle of peripheral light rays so as to reduce stray light, thereby increasing illuminance on the image surface.

Figure 21:
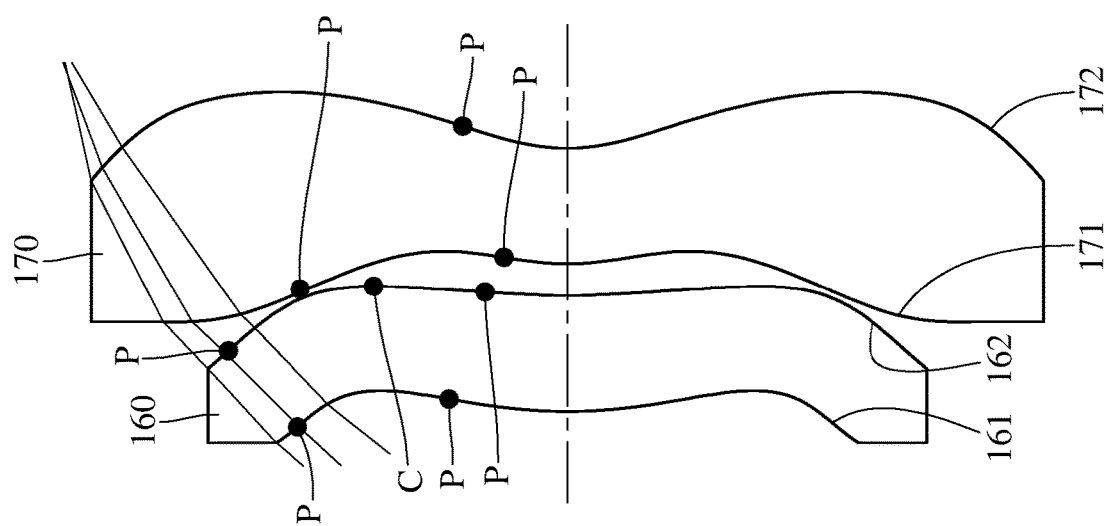
FIG. 21 shows a schematic view of a critical point of the sixth lens element and inflection points of the sixth lens element and the seventh lens element according to the 1st embodiment of the present disclosure.

There can be at least one critical point on an image-side surface of the sixth lens element. Therefore, the shape change of the sixth lens element is favorable for adjusting the incident and refraction angles of peripheral light rays so as to keep the size of the sixth lens element within a smaller diameter, thereby reducing the size of the optical photographing lens assembly. Please refer to FIG. 21, which shows a schematic view of a critical point C of the sixth lens element according to the 1st embodiment of the present disclosure.

The seventh lens element can have negative refractive power, and it is favorable for balancing the refractive power distribution on the image side of the optical photographing lens assembly to correct aberrations and to reduce the back focal length, thereby minimizing the size of the optical photographing lens assembly. The seventh lens element can have an image-side surface being concave in a paraxial region thereof, and the image-side surface of the seventh lens element can have at least one convex shape in an off-axis region thereof; therefore, the shape variation of the image-side surface of the seventh lens element is favorable for correcting off-axis aberrations so as to improve image quality. At least one of an object-side surface and the image-side surface of the seventh lens element can have at least one inflection point, and it is favorable for reducing the back focal length so as to achieve a compact arrangement while correcting field curvature and reducing the incident angle of light rays on the image surface for improved peripheral image quality. Please refer to FIG. 21, which shows a schematic view of inflection points P of the seventh lens element according to the 1st embodiment of the present disclosure.

According to the present disclosure, at least one surface among object-side surfaces and image-side surfaces of the first lens element, the second lens element, the third lens element, the fourth lens element, the fifth lens element, the sixth lens element and the seventh lens element is aspheric. Therefore, it is favorable for having more control variables for eliminating aberrations, such that the required number of the lens elements can be reduced so as to effectively shorten the total track length of the optical photographing lens assembly.

There are a total of at least nine inflection points on the object-side surfaces and the image-side surfaces of the sixth lens element and the seventh lens element. Therefore, the shape changes of the sixth lens element and seventh lens element are favorable for peripheral light rays projecting on the image surface so as to prevent stray light due to an overly large incident angle; furthermore, it is favorable for reducing the incident angle in the off-axis region on the image surface so as to provide high illuminance and further improve image quality. Please refer to FIG. 21, which shows a schematic view of inflection points P of the sixth lens element and seventh lens element according to the 1st embodiment of the present disclosure.

According to the present disclosure, refractive power of the first lens element and refractive power of the second lens element can be the two strongest among all refractive power of the seven lens elements; that is, the refractive power of the first lens element and the refractive power of the second lens element can be both stronger than refractive power of the third lens element, refractive power of the fourth lens element, refractive power of the fifth lens element, refractive power of the sixth lens element and refractive power of the seventh lens element. Therefore, controlling the refractive power distribution on the object side of the optical photographing lens assembly is favorable for reducing the total track length and thereby minimizing the size thereof. According to the present disclosure, refractive power of a single lens element is a ratio of the focal length of the optical photographing lens assembly to the focal length of the single lens element.

According to the present disclosure, at least six of the first lens element, the second lens element, the third lens element, the fourth lens element, the fifth lens element, the sixth lens element and the seventh lens element can be meniscus in a paraxial region thereof. Therefore, adjusting the shapes of the lens elements of the optical photographing lens assembly is favorable for correcting aberrations and reducing the total track length to achieve compactness. A lens element which is meniscus in a paraxial region thereof indicates that an object-side surface and an image-side surface of the lens element are respectively convex and concave in a paraxial region thereof, or are respectively concave and convex in a paraxial region thereof.

When a focal length of the optical photographing lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, and a focal length of the i-th lens element is fi, the following condition is satisfied: $\Sigma|f/fi|<2.60$, wherein i=1, 2, 3, 4, 5, 6, 7. Therefore, adjusting the sum of the refractive power of the seven lens elements is favorable for reducing the sensitivity and the total track length, and for correcting off-axis aberrations to meet the requirements of low sensitivity, compactness and high image quality, so that the optical photographing lens assembly is applicable to various applications. Preferably, the following condition can be satisfied: $\Sigma|f/fi|<2.40$, wherein i=1, 2, 3, 4, 5, 6, 7. More preferably, the following condition can be satisfied: $\Sigma|f/fi|<2.20$, wherein i=1, 2, 3, 4, 5, 6, 7. Much more preferably, the following condition can also be satisfied: $1.0<\Sigma|f/fi|<2.10$, wherein i=1, 2, 3, 4, 5, 6, 7.

When an axial distance between the object-side surface of the first lens element and an image surface is TL, and the focal length of the optical photographing lens assembly is f, the following condition can be satisfied: $0.50<TL/f<3.50$. Therefore, controlling the dimensions of the optical photographing lens assembly is favorable for obtaining a balance between a large angle of view and compactness so as to satisfy the market demands. Preferably, the following condition can also be satisfied: $0.50<TL/f<2.50$.

When a curvature radius of an image-side surface of the fifth lens element is R10, and the focal length of the optical photographing lens assembly is f, the following condition can be satisfied: $R10/f<1.30$. Therefore, adjusting the shape of the image-side surface of the fifth lens element is favorable for correcting aberrations on the image side of the optical photographing lens assembly, so as to improve image quality. Preferably, the following condition can be satisfied: $-9.0<R10/f<1.30$. More preferably, the following condition can also be satisfied: $-5.0<R10/f<0$.

When an axial distance between the object-side surface of the first lens element and the image-side surface of the seventh lens element is TD, and a maximum image height of the optical photographing lens assembly (half of a diagonal length of an effective photosensitive area of an image sensor) is ImgH, the following condition can be satisfied: $0.50<TD/ImgH<5.0$. Therefore, it is favorable for minimizing the size of the optical photographing lens assembly and increasing the image surface area. Preferably, the following condition can also be satisfied: $0.70<TD/ImgH<1.80$.

When the focal length of the optical photographing lens assembly is f, and a curvature radius of the image-side surface of the sixth lens element is R12, the following condition can be satisfied: $0 \le f/R12<5.0$. Therefore, adjusting the shape of the image-side surface of the sixth lens element is favorable for reducing the total track length so that the optical photographing lens assembly is applicable to various applications. Preferably, the following condition can also be satisfied: $0 \le f/R12<3.50$.

When the focal length of the optical photographing lens assembly is f, and an entrance pupil diameter of the optical photographing lens assembly is EPD, the following condition can be satisfied: $0.50<f/EPD<2.0$. Therefore, controlling the amount of incident light is favorable for increasing illuminance on the image surface so that an image capturing unit including the optical photographing lens assembly is able to capture sufficient amount of image data in low-light conditions (e.g., night-time) or short exposure time (e.g., dynamic photography). As a result, an electronic device equipped with the image capturing unit can produce high quality images after image processing and is applicable in various conditions. Preferably, the following condition can also be satisfied: 1.0<f/EPD<1.90.

According to the present disclosure, the optical photographing lens assembly further includes an aperture stop. When the axial distance between the object-side surface of the first lens element and the image-side surface of the seventh lens element is TD, and an axial distance between the aperture stop and the image-side surface of the seventh lens element is SD, the following condition can be satisfied: 0.80<TD/SD<1.30. Therefore, the positioning of the aperture stop is favorable for reducing the total track length and increasing the image-sensing efficiency of the image sensor.

When the focal length of the optical photographing lens assembly is f, a curvature radius of an object-side surface of one lens element of the seven lens elements is Ra, and a curvature radius of an image-side surface of said lens element is Rb, at least six of the seven lens elements satisfy the following condition: $0 \leq f^2/(Ra \times Rb)$. Therefore, adjusting the shapes of the lens elements of the optical photographing lens assembly is favorable for correcting aberrations and reducing the total track length to achieve compactness.

When a curvature radius of the object-side surface of the third lens element is R5, and a curvature radius of the object-side surface of the fifth lens element is R9, the following condition can be satisfied: R5/R9<1.50. Therefore, adjusting the object-side surfaces of the third and the fifth lens elements is favorable for correcting astigmatism, thereby improving image quality. Preferably, the following condition can be satisfied: R5/R9<0.80. More preferably, the following condition can also be satisfied: −9.0<R5/R9<0.50.

When a curvature radius of the image-side surface of the seventh lens element is R14, and an axial distance between the sixth lens element and the seventh lens element is T67, the following condition can be satisfied: 1.0<R14/T67<9.0. Therefore, it is favorable for reducing the back focal length and obtaining a balance between compactness and high assembling yield rate.

When an Abbe number of the second lens element is V2, an Abbe number of the fourth lens element is V4, and an Abbe number of the fifth lens element is V5, the following condition can be satisfied: 10.0<(V2+V4+V5)/3<35.0. Therefore, proper material selection of the lens elements is favorable for aberration corrections so as to satisfy demanding product specifications.

When the focal length of the optical photographing lens assembly is f, the focal length of the first lens element is f1, the focal length of the second lens element is f2, the focal length of the third lens element is f3, the focal length of the fourth lens element is f4, the focal length of the fifth lens element is f5, the focal length of the sixth lens element is f6, the focal length of the seventh lens element is f7, and the focal length of the i-th lens element is fi, at least three of the seven lens elements satisfy the following condition: |f/fi|<0.10, wherein i=1, 2, 3, 4, 5, 6, 7. Therefore, controlling the refractive power of the seven lens elements is favorable for reducing the sensitivity and correcting off-axis aberrations.

When an axial distance between the image-side surface of the seventh lens element and the image surface is BL, and the focal length of the optical photographing lens assembly is f, the following condition can be satisfied: 0.05<BL/f<0.50. Therefore, it is favorable for reducing the back focal length and thereby minimizing the size of the optical photographing lens assembly.

When a minimum value among all Abbe numbers of the seven lens elements of the optical photographing lens assembly is Vmin, the following condition can be satisfied: 10.0<Vmin<23.0. Therefore, proper material selection of the lens elements is favorable for correcting chromatic aberration and preventing image overlapping so as to improve image quality. Preferably, the following condition can also be satisfied: 10.0<Vmin<19.5.

When a maximum value among all axial distances between every adjacent lens element of the optical photographing lens assembly is ATmax, and a minimum value among all axial distances between every adjacent lens element of the optical photographing lens assembly is ATmin, the following condition can be satisfied: 1.20<ATmax/ATmin<25.0. Therefore, it is favorable for spacing between each of the seven lens elements to obtain a better space utilization with a higher assembling yield rate. Preferably, the following condition can also be satisfied: 5.0<ATmax/ATmin<25.0.

Figure 22:
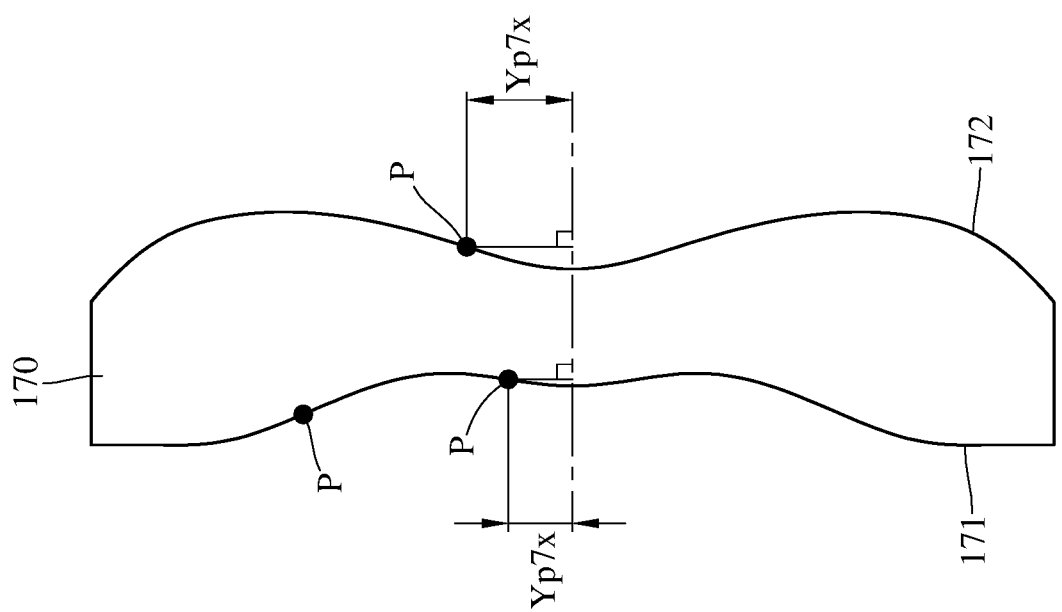
FIG. 22 shows a schematic view of Yp7x according to the 1st embodiment of the present disclosure.

When a vertical distance between an inflection point closest to an optical axis on one of the surfaces (the object-side surface or the image-side surface) of the seventh lens element and the optical axis is Yp7x, and the focal length of the optical photographing lens assembly is f, the following condition can be satisfied: 0.03<Yp7x/f<1.0. Therefore, adjusting the shape of the seventh lens element is favorable for correcting off-axis distortion and thereby improving the image resolution. Preferably, the following condition can also be satisfied: 0.05<Yp7x/f<0.80. Please refer to FIG. 22, which shows a schematic view of Yp7x according to the 1st embodiment of the present disclosure. According to the present disclosure, when one surface of the seventh lens element has a single inflection point, Yp7x is a vertical distance between the inflection point and the optical axis. When one surface of the seventh lens element has a plurality of inflection points, Yp7x is a vertical distance between one of the inflection points, which is closest to the optical axis, and the optical axis.

When half of a maximum field of view of the optical photographing lens assembly is HFOV, the following condition can be satisfied: 40.0 [deg.]<HFOV<80.0 [deg.]. Therefore, it is favorable for increasing the viewing angle so that the optical photographing lens assembly can be applicable to more applications.

When the focal length of the optical photographing lens assembly is f, the focal length of the first lens element is f1, the focal length of the second lens element is f2, the focal length of the third lens element is f3, the focal length of the fourth lens element is f4, the focal length of the fifth lens element is f5, the focal length of the sixth lens element is f6, the focal length of the seventh lens element is f7, the focal length of the i-th lens element is fi, and an f-number of the optical photographing lens assembly is Fno, the following condition can be satisfied: $1.0<\Sigma|f/fi|\times Fno<4.0$, wherein i=1, 2, 3, 4, 5, 6, 7. Therefore, adjusting the refractive power of the optical photographing lens assembly and the size of the aperture stop is favorable for reducing the sensitivity and increasing illuminance.

When a maximum value among all central thicknesses of the seven lens elements is CTmax, and a minimum value among all central thicknesses of the seven lens elements is CTmin, the following condition can be satisfied: 1.20<CTmax/CTmin<4.0. Therefore, controlling the central thicknesses of the seven lens elements is favorable for balancing the spacing between the lens elements in the optical photographing lens assembly and thereby ensuring high image quality.

When the refractive power of the first lens element is P1, the refractive power of the second lens element is P2, the refractive power of the third lens element is P3, the refractive power of the fourth lens element is P4, the refractive power of the fifth lens element is P5, the refractive power of the sixth lens element is P6, and the refractive power of the seventh lens element is P7, the following condition can be satisfied: 0.10<(|P3|+|P4|+|P5|+|P6|)/(|P1|+|P2|+|P7|) <1.50. Therefore, properly arranging the refractive power distribution of the seven lens elements is favorable for the optical photographing lens assembly to obtain a balance between a large angle of view and compactness. According to the present disclosure, the refractive power of a single lens element is a ratio of the focal length of the optical photographing lens assembly to the focal length of the single lens element.

According to the present disclosure, the aforementioned features and conditions can be utilized in numerous combinations so as to achieve corresponding effects.

According to the present disclosure, the lens elements of the optical photographing lens assembly can be made of either glass or plastic material. When the lens elements are made of glass material, the refractive power distribution of the optical photographing lens assembly may be more flexible. The glass lens element can either be made by grinding or molding. When the lens elements are made of plastic material, the manufacturing cost can be effectively reduced. Furthermore, surfaces of each lens element can be arranged to be aspheric, which allows more control variables for eliminating aberrations thereof, the required number of the lens elements can be reduced, and the total track length of the optical photographing lens assembly can be effectively shortened. The aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, an image surface of the optical photographing lens assembly, based on the corresponding image sensor, can be flat or curved, especially a curved surface being concave facing towards the object side of the optical photographing lens assembly.

According to the present disclosure, an image correction unit, such as a field flattener, can be optionally disposed between the lens element closest to the image side of the optical photographing lens assembly and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of an image capturing unit. In general, a preferable image correction unit is, for example, a thin transparent element having a concave object-side surface and a planar image-side surface, and the thin transparent element is disposed near the image surface.

According to the present disclosure, the optical photographing lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical photographing lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the optical photographing lens assembly and thereby provides a wider field of view for the same.

According to the above description of the present disclosure, the following specific embodiments are provided for further explanation.

1st Embodiment

Figure 2:
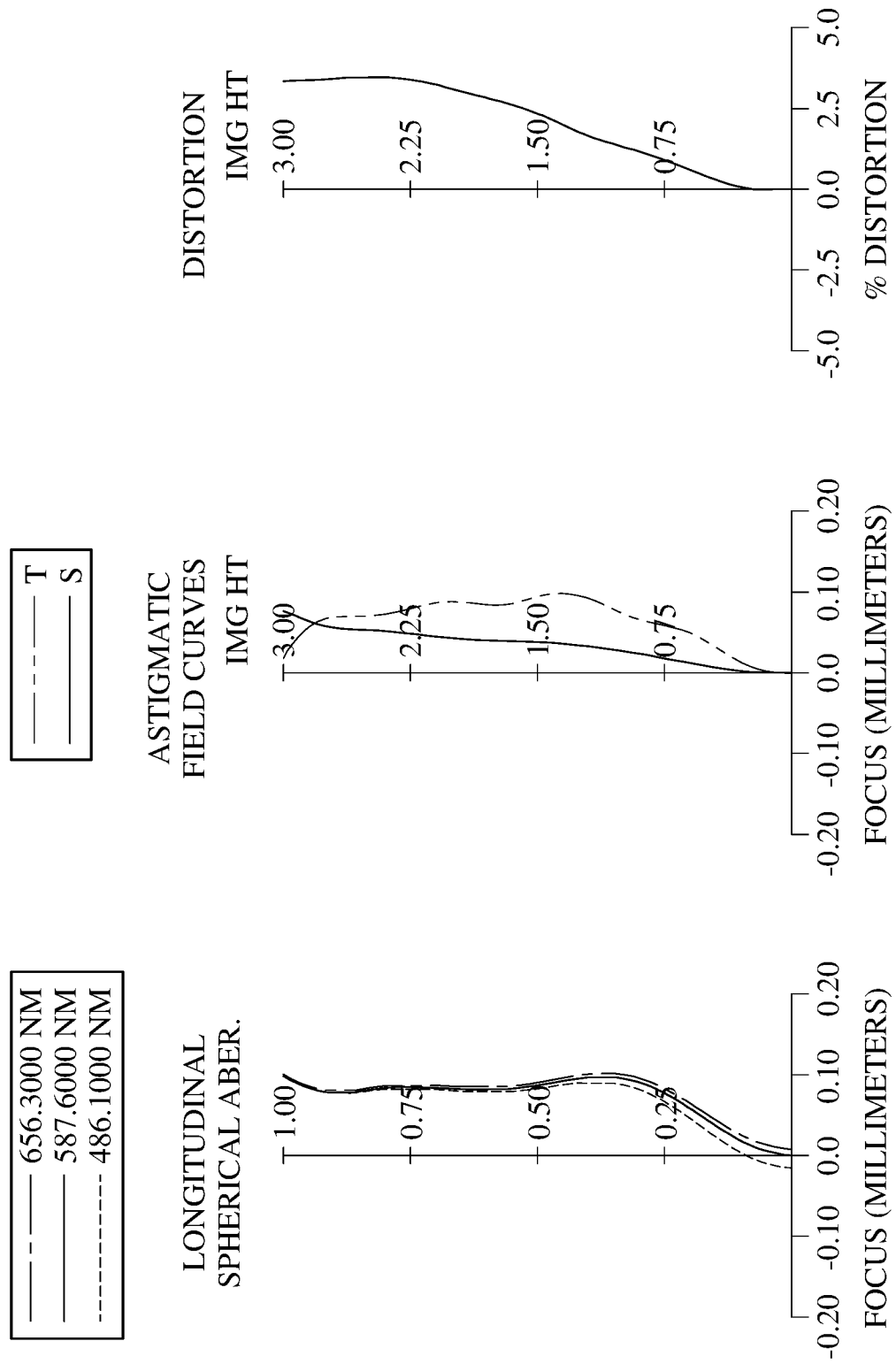
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical photographing lens assembly (its reference numeral is omitted) of the present disclosure and an image sensor 195. The optical photographing lens assembly includes, in order from an object side to an image side, a first lens element 110, an aperture stop 100, a second lens element 120, a third lens element 130, a fourth lens element 140, a fifth lens element 150, a sixth lens element 160, a seventh lens element 170, a filter 180 and an image surface 190. The optical photographing lens assembly includes seven single and non-cemented lens elements (110, 120, 130, 140, 150, 160 and 170) with no additional lens element disposed between each of the adjacent seven lens elements, wherein there is an air gap in a paraxial region between every adjacent lens element.

The first lens element 110 with positive refractive power has an object-side surface 111 being convex in a paraxial region thereof and an image-side surface 112 being concave in a paraxial region thereof. The first lens element 110 is made of plastic material, and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric.

The fourth lens element 140 with positive refractive power has an object-side surface 141 being convex in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric.

The sixth lens element 160 with positive refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric. The image-side surface 162 of the sixth lens element 160 has at least one critical point. Each of the object-side surface 161 and the image-side surface 162 of the sixth lens element 160 has at least one inflection point.

The seventh lens element 170 with negative refractive power has an object-side surface 171 being convex in a paraxial region thereof and an image-side surface 172 being concave in a paraxial region thereof. The seventh lens element 170 is made of plastic material and has the object-side surface 171 and the image-side surface 172 being both aspheric. Each of the object-side surface 171 and the image-side surface 172 of the seventh lens element 170 has at least one inflection point.

The filter 180 is made of glass material and located between the seventh lens element 170 and the image surface 190, and will not affect the focal length of the optical photographing lens assembly. The image sensor 195 is disposed on or near the image surface 190 of the optical photographing lens assembly.

In this embodiment, there are a total of seven inflection points on the object-side surface 161 and the image-side surface 162 of the sixth lens element 160, and the object-side surface 171 and the image-side surface 172 of the seventh lens element 170.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the optical photographing lens assembly of the image capturing unit according to the 1st embodiment, when a focal length of the optical photographing lens assembly is f, an f-number of the optical photographing lens assembly is Fno, and half of a maximum field of view of the optical photographing lens assembly is HFOV, these parameters have the following values: f=3.28 millimeters (mm), Fno=1.58, HFOV=41.2 degrees (deg.).

When a minimum value among all Abbe numbers of the seven lens elements of the optical photographing lens assembly is Vmin, the following condition is satisfied: Vmin=20.4. In this embodiment, an Abbe number of the second lens element 120 is smaller than an Abbe number of the first lens element 110, an Abbe number of the third lens element 130, an Abbe number of the fourth lens element 140, an Abbe number of the fifth lens element 150, an Abbe number of the sixth lens element 160 and an Abbe number of the seventh lens element 170. Therefore, Vmin is equal to the Abbe number of the second lens element 120.

When the Abbe number of the second lens element 120 is V2, the Abbe number of the fourth lens element 140 is V4, and the Abbe number of the fifth lens element 150 is V5, the following condition is satisfied: (V2+V4+V5)/3=34.10.

When a maximum value among all axial distances between every adjacent lens element of the optical photographing lens assembly is ATmax, and a minimum value among all axial distances between every adjacent lens element of the optical photographing lens assembly is ATmin, the following condition is satisfied: ATmax/ATmin=7.86. In this embodiment, ATmax=0.275 mm, which is an axial distance between the second lens element 120 and the third lens element 130; ATmin=0.035 mm, which is an axial distance between the fifth lens element 150 and the sixth lens element 160. In this embodiment, an axial distance between two adjacent lens elements is an air gap in a paraxial region between the two adjacent lens elements.

When a maximum value among all central thicknesses of the seven lens elements is CTmax, and a minimum value among all central thicknesses of the seven lens elements is CTmin, the following condition is satisfied: CTmax/CTmin=3.08. In this embodiment, CTmax=0.678 mm, which is a central thickness of the sixth lens element 160; CTmin=0.220 mm, which is a central thickness of the second lens element 120 or a central thickness of the fifth lens element 150.

When an axial distance between the object-side surface 111 of the first lens element 110 and the image surface 190 is TL, and the focal length of the optical photographing lens assembly is f, the following condition is satisfied: TL/f=1.46.

When an axial distance between the image-side surface 172 of the seventh lens element 170 and the image surface 190 is BL, and the focal length of the optical photographing lens assembly is f, the following condition is satisfied: BL/f=0.22.

When an axial distance between the object-side surface 111 of the first lens element 110 and the image-side surface 172 of the seventh lens element 170 is TD, and a maximum image height of the optical photographing lens assembly is ImgH, the following condition is satisfied: TD/ImgH=1.36.

When a curvature radius of the image-side surface 152 of the fifth lens element 150 is R10, and the focal length of the optical photographing lens assembly is f, the following condition is satisfied: R10/f=−0.70.

When a curvature radius of the object-side surface 131 of the third lens element 130 is R5, and a curvature radius of the object-side surface 151 of the fifth lens element 150 is R9, the following condition is satisfied: R5/R9=−2.30.

When a curvature radius of the image-side surface 172 of the seventh lens element 170 is R14, and an axial distance between the sixth lens element 160 and the seventh lens element 170 is T67, the following condition is satisfied: R14/T67=6.06.

When the focal length of the optical photographing lens assembly is f, and a curvature radius of the image-side surface 162 of the sixth lens element 160 is R12, the following condition is satisfied: f/R12=0.88.

When the focal length of the optical photographing lens assembly is f, and an entrance pupil diameter of the optical photographing lens assembly is EPD, the following condition is satisfied: f/EPD=1.58.

When the focal length of the optical photographing lens assembly is f, a focal length of the first lens element 110 is f1, a focal length of the second lens element 120 is f2, a focal length of the third lens element 130 is f3, a focal length of the fourth lens element 140 is f4, a focal length of the fifth lens element 150 is f5, a focal length of the sixth lens element 160 is f6, a focal length of the seventh lens element 170 is f7, and a focal length of the i-th lens element is fi, the following condition is satisfied: Σ|f/fi|=1.897, wherein i=1, 2, 3, 4, 5, 6, 7. In this embodiment, |f/f1|=0.780; |f/f2|=0.297; |f/f3|=0.155; |f/f4|=0.226; |f/f5|=0.147; |f/f6|=0.174; and |f/f7|=0.118.

When the focal length of the optical photographing lens assembly is f, the focal length of the first lens element 110 is f1, the focal length of the second lens element 120 is f2, the focal length of the third lens element 130 is f3, the focal length of the fourth lens element 140 is f4, the focal length of the fifth lens element 150 is f5, the focal length of the sixth lens element 160 is f6, the focal length of the seventh lens element 170 is f7, the focal length of the i-th lens element is fi, and an f-number of the optical photographing lens assembly is Fno, the following condition is satisfied: Σ|f/fi|×Fno=3.00, wherein i=1, 2, 3, 4, 5, 6, 7.

When the focal length of the optical photographing lens assembly is f, a curvature radius of the object-side surface 111 of the first lens element 110 is R1, and a curvature radius of the image-side surface 112 of the first lens element 110 is R2, the following condition is satisfied: $f^2$/(R1×R2)=0.68.

When the focal length of the optical photographing lens assembly is f, a curvature radius of the object-side surface 121 of the second lens element 120 is R3, and a curvature radius of the image-side surface 122 of the second lens element 120 is R4, the following condition is satisfied: $f^2$/(R3×R4)=3.29.

When the focal length of the optical photographing lens assembly is f, the curvature radius of the object-side surface 131 of the third lens element 130 is R5, and a curvature radius of the image-side surface 132 of the third lens element 130 is R6, the following condition is satisfied: $f^2$/(R5×R6)=0.37.

When the focal length of the optical photographing lens assembly is f, a curvature radius of the object-side surface 141 of the fourth lens element 140 is R7, and a curvature radius of the image-side surface 142 of the fourth lens element 140 is R8, the following condition is satisfied: $f^2$/(R7×R8)=−0.04.

When the focal length of the optical photographing lens assembly is f, the curvature radius of the object-side surface 151 of the fifth lens element 150 is R9, and the curvature radius of the image-side surface 152 of the fifth lens element 150 is R10, the following condition is satisfied: $f^2$/(R9×R10)= 2.49.

When the focal length of the optical photographing lens assembly is f, a curvature radius of the object-side surface 161 of the sixth lens element 160 is R11, and the curvature radius of the image-side surface 162 of the sixth lens element 160 is R12, the following condition is satisfied: $f^2$/(R11×R12)=0.99.

When the focal length of the optical photographing lens assembly is f, a curvature radius of the object-side surface 171 of the seventh lens element 170 is R13, and curvature radius of the image-side surface 172 of the seventh lens element 170 is R14, the following condition is satisfied: $f^2$/(R13×R14)=6.49.

When the refractive power of the first lens element 110 is P1, the refractive power of the second lens element 120 is P2, the refractive power of the third lens element 130 is P3, the refractive power of the fourth lens element 140 is P4, the refractive power of the fifth lens element 150 is P5, the refractive power of the sixth lens element 160 is P6, and the refractive power of the seventh lens element 170 is P7, the following condition is satisfied: (|P3|+|P4|+|P5|+|P6|)/(|P1|+|P2|+|P7|)=0.59.

When the axial distance between the object-side surface 111 of the first lens element 110 and the image-side surface 172 of the seventh lens element 170 is TD, and an axial distance between the aperture stop 100 and the image-side surface 172 of the seventh lens element 170 is SD, the following condition is satisfied: TD/SD=1.20.

When a vertical distance between an inflection point closest to the optical axis on the object-side surface 171 or the image-side surface 172 of the seventh lens element 170 and the optical axis is Yp7x, a vertical distance between an inflection point closest to the optical axis on the object-side surface 171 of the seventh lens element 170 and the optical axis is Yp71, and the focal length of the optical photographing lens assembly is f, the following condition is satisfied: Yp7x/f=0.11, wherein x=1.

When the vertical distance between the inflection point closest to the optical axis on the object-side surface 171 or the image-side surface 172 of the seventh lens element 170 and the optical axis is Yp7x, a vertical distance between an inflection point closest to the optical axis on the image-side surface 172 of the seventh lens element 170 and the optical axis is Yp72, and the focal length of the optical photographing lens assembly is f, the following condition is satisfied: Yp7x/f=0.19, wherein x=2.

The detailed optical data of the 1st embodiment are shown in Table 1 and the aspheric surface data are shown in Table 2 below.

TABLE 1

1st Embodiment
f = 3.28 mm, Fno = 1.58, HFOV = 41.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.851 | (ASP) | 0.626 | Plastic | 1.545 | 56.0 | 4.20 |
| 2 | | 8.525 | (ASP) | 0.042 | | | | |
| 3 | Ape. Stop | Plano | | 0.015 | | | | |

TABLE 1-continued

1st Embodiment
f = 3.28 mm, Fno = 1.58, HFOV = 41.2 deg.

| Surface # | | Curvature Radius | | Thickness | Material | Index | Abbe # | Focal Length |
|---|---|---|---|---|---|---|---|---|
| 4 | Lens 2 | 2.097 | (ASP) | 0.220 | Plastic | 1.660 | 20.4 | −11.05 |
| 5 | | 1.561 | (ASP) | 0.275 | | | | |
| 6 | Lens 3 | 4.337 | (ASP) | 0.308 | Plastic | 1.544 | 55.9 | 21.21 |
| 7 | | 6.778 | (ASP) | 0.134 | | | | |
| 8 | Lens 4 | 12.921 | (ASP) | 0.516 | Plastic | 1.544 | 55.9 | 14.52 |
| 9 | | −20.001 | (ASP) | 0.142 | | | | |
| 10 | Lens 5 | −1.889 | (ASP) | 0.220 | Plastic | 1.614 | 26.0 | −22.34 |
| 11 | | −2.288 | (ASP) | 0.035 | | | | |
| 12 | Lens 6 | 2.913 | (ASP) | 0.678 | Plastic | 1.544 | 55.9 | 18.80 |
| 13 | | 3.741 | (ASP) | 0.186 | | | | |
| 14 | Lens 7 | 1.472 | (ASP) | 0.676 | Plastic | 1.511 | 56.8 | −27.78 |
| 15 | | 1.126 | (ASP) | 0.500 | | | | |
| 16 | Filter | Plano | | 0.180 | Glass | 1.517 | 64.2 | — |
| 17 | | Plano | | 0.040 | | | | |
| 18 | Image | Plano | | — | | | | |

Note:
Reference wavelength is 587.6 nm (d-line).

TABLE 2

Aspheric Coefficients

| | Surface # | | | | |
|---|---|---|---|---|---|
| | 1 | 2 | 4 | 5 | 6 |
| k = | 1.0059E−01 | −8.9036E+01 | −1.5876E+01 | −1.1101E+01 | −2.6562E+01 |
| A4 = | −3.0811E−02 | −2.3183E−01 | −2.2927E−01 | 1.1289E−01 | −4.5477E−02 |
| A6 = | 1.6076E−01 | 7.9396E−01 | 7.8733E−01 | −2.9580E−01 | 2.5417E−01 |
| A8 = | −4.2893E−01 | −1.5405E+00 | −1.4897E+00 | 1.0386E+00 | −8.6980E−01 |
| A10 = | 6.4586E−01 | 1.8952E+00 | 1.7513E+00 | −2.1056E+00 | 1.5902E+00 |
| A12 = | −5.5595E−01 | −1.4493E+00 | −1.2306E+00 | 2.3956E+00 | −1.6647E+00 |
| A14 = | 2.5638E−01 | 6.2236E−01 | 4.5918E−01 | −1.4206E+00 | 8.5395E−01 |
| A16 = | −4.9977E−02 | −1.1576E−01 | −6.9620E−02 | 3.4429E−01 | −1.5318E−01 |

| | Surface # | | | | |
|---|---|---|---|---|---|
| | 7 | 8 | 9 | 10 | 11 |
| k = | −6.3307E+01 | −2.2317E+01 | 9.0000E+01 | 7.6828E−01 | −8.3156E+00 |
| A4 = | −2.5332E−02 | −1.2320E−01 | −3.3343E−01 | −3.0604E−01 | −2.0928E−01 |
| A6 = | −3.3875E−02 | 1.8174E−01 | 3.5439E−01 | 7.6879E−01 | 3.3855E−01 |
| A8 = | 1.9253E−01 | −4.4203E−01 | −4.2578E−01 | −6.9749E−01 | −1.6980E+00 |
| A10 = | −5.0824E−01 | 5.5527E−01 | 4.7504E−01 | 3.6871E−01 | −5.2905E−02 |
| A12 = | 6.4228E−01 | −3.4594E−01 | −3.5728E−01 | −1.1971E−01 | 9.0933E−02 |
| A14 = | −4.2314E−01 | 9.8157E−02 | 1.4421E−01 | 2.2347E−02 | −3.3976E−02 |
| A16 = | 1.1132E−01 | −9.5333E−03 | −2.3010E−02 | −1.2122E−03 | 4.2100E−03 |

| | Surface # | | | |
|---|---|---|---|---|
| | 12 | 13 | 14 | 15 |
| k = | −3.4497E−01 | −9.0000E+01 | −3.4720E+00 | −1.3424E+00 |
| A4 = | −1.6537E−02 | −5.2058E−02 | −4.2495E−01 | −2.9487E−01 |
| A6 = | −1.0090E−01 | 6.0332E−02 | 2.7147E−01 | 1.6851E−01 |
| A8 = | 1.1264E−01 | −3.6630E−02 | −1.0521E−01 | −6.1948E−02 |
| A10 = | −7.2811E−02 | 8.5202E−03 | 2.6247E−02 | 1.4113E−02 |
| A12 = | 2.1110E−02 | −7.8587E−04 | −3.9896E−03 | −1.9077E−03 |
| A14 = | −2.1472E−03 | 1.9965E−05 | 3.3387E−04 | 1.3886E−04 |
| A16 = | — | — | −1.1799E−05 | −4.1755E−06 |

In Table 1, the curvature radius, the thickness and the focal length are shown in millimeters (mm). Surface numbers 0-18 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
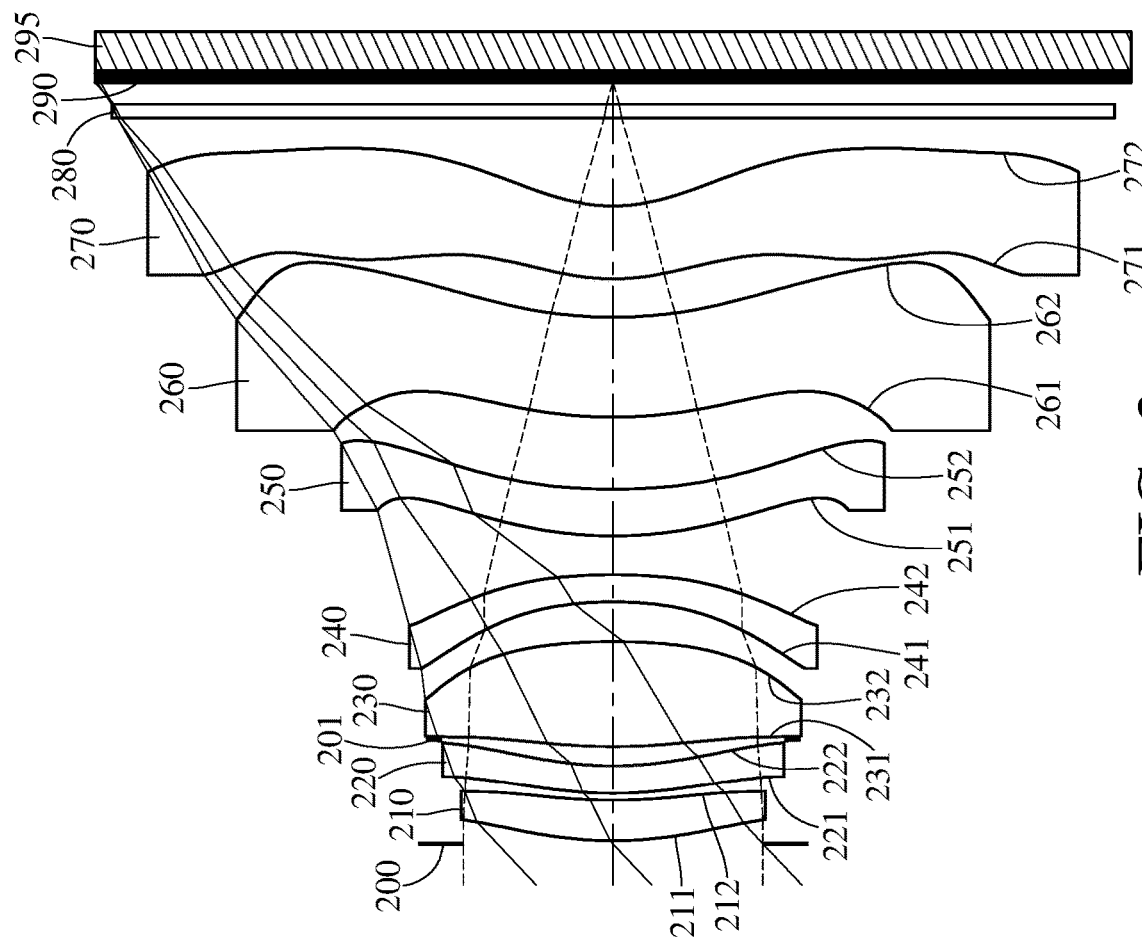
FIG. 3 is a schematic view of an image capturing unit according to the 2nd embodiment of the present disclosure.

FIG. 3 is a schematic view of an image capturing unit according to the 2nd embodiment of the present disclosure.

Figure 4:
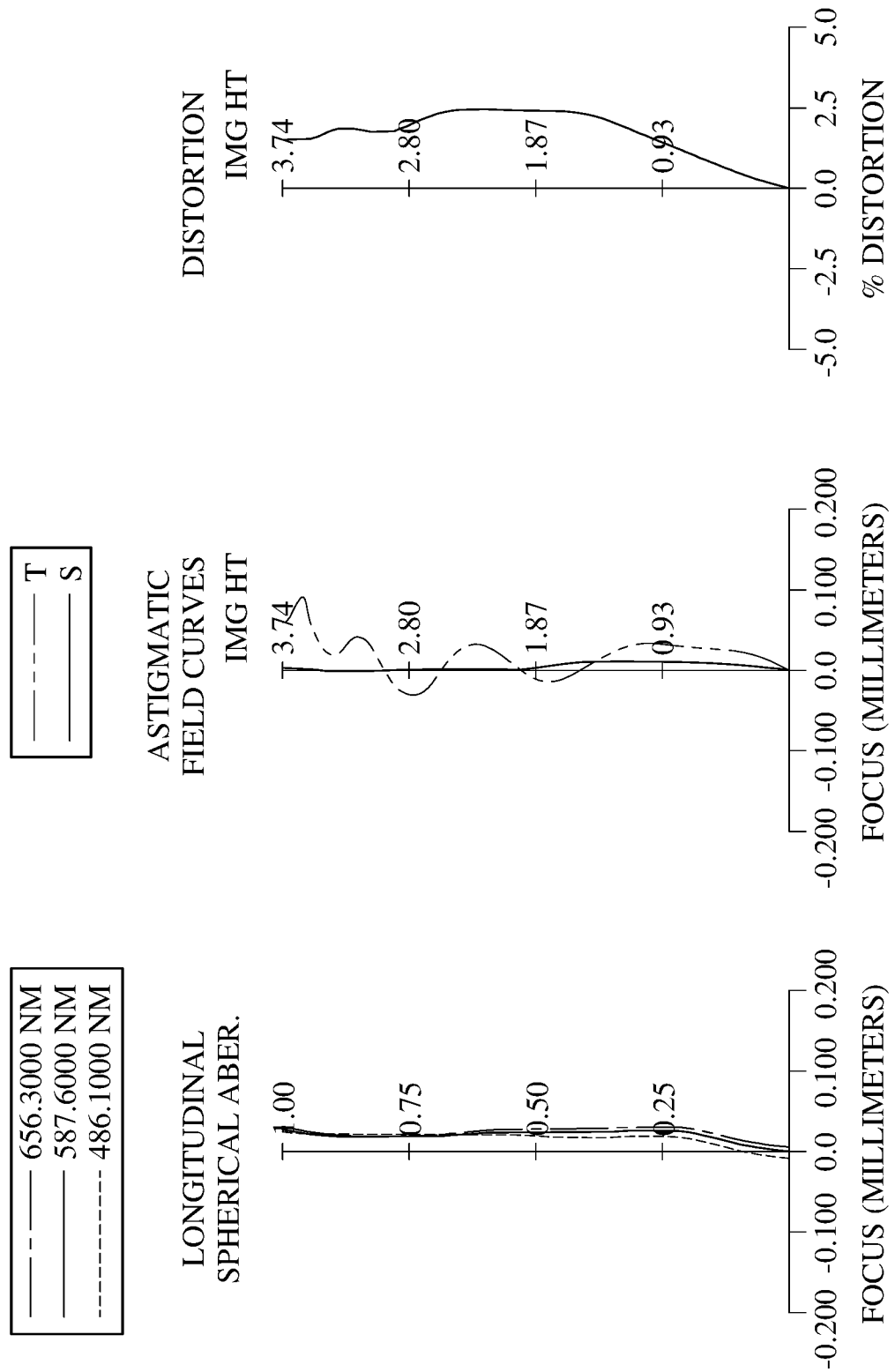
FIG. 4 shows spherical aberration curves, astigmatic field curves and a distortion curve of the image capturing unit according to the 2nd embodiment.

FIG. 4 shows, in order from left to right, spherical aberration curves, astigmatic field curves and a distortion curve of the image capturing unit according to the 2nd embodiment. In FIG. 3, the image capturing unit includes the optical photographing lens assembly (its reference numeral is omitted) of the present disclosure and an image sensor 295. The optical photographing lens assembly includes, in order from an object side to an image side, an aperture stop 200, a first lens element 210, a second lens element 220, a stop 201, a third lens element 230, a fourth lens element 240, a fifth lens element 250, a sixth lens element 260, a seventh lens element 270, a filter 280 and an image surface 290. The optical photographing lens assembly includes seven single and non-cemented lens elements (210, 220, 230, 240, 250, 260 and 270) with no additional lens element disposed between each of the adjacent seven lens elements, wherein there is an air gap in a paraxial region between every adjacent lens element.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of plastic material and has the object-side surface 231 and the image-side surface 232 being both aspheric.

The fourth lens element 240 with negative refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with positive refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric.

The sixth lens element 260 with negative refractive power has an object-side surface 261 being convex in a paraxial region thereof and an image-side surface 262 being concave in a paraxial region thereof. The sixth lens element 260 is made of plastic material and has the object-side surface 261 and the image-side surface 262 being both aspheric. The image-side surface 262 of the sixth lens element 260 has at least one critical point. Each of the object-side surface 261 and the image-side surface 262 of the sixth lens element 260 has at least one inflection point.

The seventh lens element 270 with negative refractive power has an object-side surface 271 being convex in a paraxial region thereof and an image-side surface 272 being concave in a paraxial region thereof. The seventh lens element 270 is made of plastic material and has the object-side surface 271 and the image-side surface 272 being both aspheric. Each of the object-side surface 271 and the image-side surface 272 of the seventh lens element 270 has at least one inflection point.

The filter 280 is made of glass material and located between the seventh lens element 270 and the image surface 290, and will not affect the focal length of the optical photographing lens assembly. The image sensor 295 is disposed on or near the image surface 290 of the optical photographing lens assembly.

In this embodiment, there are a total of twelve inflection points on the object-side surface 261 and the image-side surface 262 of the sixth lens element 260, and the object-side surface 271 and the image-side surface 272 of the seventh lens element 270.

The detailed optical data of the 2nd embodiment are shown in Table 3 and the aspheric surface data are shown in Table 4 below.

TABLE 3

2nd Embodiment
f = 3.91 mm, Fno = 1.80, HFOV = 43.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.021 | | | | |
| 2 | Lens 1 | 2.874 | (ASP) | 0.295 | Plastic | 1.544 | 56.0 | 15.49 |
| 3 | | 4.204 | (ASP) | 0.050 | | | | |
| 4 | Lens 2 | 2.978 | (ASP) | 0.200 | Plastic | 1.688 | 18.7 | −25.33 |
| 5 | | 2.474 | (ASP) | 0.192 | | | | |
| 6 | Stop | Plano | | −0.050 | | | | |
| 7 | Lens 3 | 4.432 | (ASP) | 0.763 | Plastic | 1.544 | 56.0 | 4.32 |
| 8 | | −4.692 | (ASP) | 0.287 | | | | |
| 9 | Lens 4 | −2.967 | (ASP) | 0.197 | Plastic | 1.669 | 19.5 | −13.19 |
| 10 | | −4.590 | (ASP) | 0.281 | | | | |
| 11 | Lens 5 | 3.297 | (ASP) | 0.342 | Plastic | 1.511 | 56.8 | 18.23 |
| 12 | | 4.926 | (ASP) | 0.522 | | | | |
| 13 | Lens 6 | 3.691 | (ASP) | 0.723 | Plastic | 1.544 | 56.0 | −1484.35 |
| 14 | | 3.421 | (ASP) | 0.278 | | | | |
| 15 | Lens 7 | 1.568 | (ASP) | 0.533 | Plastic | 1.544 | 56.0 | −17.72 |
| 16 | | 1.187 | (ASP) | 0.640 | | | | |
| 17 | Filter | Plano | | 0.100 | Glass | 1.517 | 64.2 | — |

TABLE 3-continued

2nd Embodiment
f = 3.91 mm, Fno = 1.80, HFOV = 43.2 deg.

| Surface # | | Curvature Radius | Thickness | Material | Index | Abbe # | Focal Length |
|---|---|---|---|---|---|---|---|
| 18 | | Plano | 0.154 | | | | |
| 19 | Image | Plano | — | | | | |

Note:
Reference wavelength is 587.6 nm (d-line).
An effective radius of the stop 201 (Surface 6) is 1.255 mm.

TABLE 4

Aspheric Coefficients

| Surface # | | | | |
|---|---|---|---|---|
| 2 | 3 | 4 | 5 | 7 |

| | 2 | 3 | 4 | 5 | 7 |
|---|---|---|---|---|---|
| k = | −2.7266E+00 | −3.6896E+01 | −1.9854E+01 | −8.3134E+00 | −8.9892E+01 |
| A4 = | −1.4792E−02 | 2.3034E−02 | −1.8353E−03 | −3.1862E−02 | 8.5523E−02 |
| A6 = | 8.1499E−02 | −3.0022E−03 | 1.3135E−01 | 5.8254E−02 | −2.6962E−01 |
| A8 = | −5.3866E−01 | −3.1148E−01 | −7.0048E−01 | −8.8110E−02 | 5.7122E−01 |
| A10 = | 1.6181E+00 | 7.3240E−01 | 1.6321E+00 | −2.7262E−02 | −9.6738E−01 |
| A12 = | −3.0189E+00 | −1.0686E+00 | −2.4310E+00 | 2.2226E−01 | 1.1535E+00 |
| A14 = | 3.5172E+00 | 1.1301E+00 | 2.4157E+00 | −2.8701E−01 | −9.2926E−01 |
| A16 = | −2.4822E+00 | −7.8451E−01 | −1.5103E+00 | 1.8126E−01 | 4.7570E−01 |
| A18 = | 9.7146E−01 | 3.0926E−01 | 5.2934E−01 | −5.8092E−02 | −1.3672E−01 |
| A20 = | −1.6162E−01 | −5.1763E−02 | −7.9072E−02 | 7.4475E−03 | 1.6588E−02 |

| | 8 | 9 | 10 | 11 | 12 |
|---|---|---|---|---|---|
| k = | −8.9185E+01 | 8.8152E−01 | −4.5698E+01 | 1.6616E+00 | −1.5966E+00 |
| A4 = | −1.5877E−01 | −1.1542E−01 | −1.3930E−01 | 6.1483E−02 | 1.0183E−01 |
| A6 = | 1.3123E−01 | 8.6895E−02 | 6.5374E−02 | −1.7288E−01 | −1.4962E−01 |
| A8 = | −1.5601E−01 | −1.1315E−01 | −2.4261E−02 | 2.3299E−01 | 1.3053E−01 |
| A10 = | 1.1563E−01 | 2.2445E−01 | 5.4829E−02 | −2.2013E−01 | −6.9217E−02 |
| A12 = | −2.4412E−02 | −2.9258E−01 | −8.3632E−02 | 1.4184E−01 | 2.2161E−02 |
| A14 = | −4.5038E−02 | 2.3312E−01 | 6.3075E−02 | −6.0879E−02 | −4.3623E−03 |
| A16 = | 4.8200E−02 | −1.1178E−01 | −2.5849E−02 | 1.6288E−02 | 5.3181E−04 |
| A18 = | −2.0023E−02 | 2.9611E−02 | 5.5436E−03 | −2.4224E−03 | −3.9571E−05 |
| A20 = | 3.1953E−03 | −3.2972E−03 | −4.7757E−04 | 1.4970E−04 | 1.4764E−06 |

| | 13 | 14 | 15 | 16 |
|---|---|---|---|---|
| k = | 1.6359E−01 | −2.1184E−01 | −6.7600E+00 | −1.0713E+00 |
| A4 = | 4.7826E−02 | 1.7175E+00 | −1.6447E−02 | −1.9398E−01 |
| A6 = | −8.6177E−02 | −2.1477E+01 | −8.7790E−02 | 6.5684E−02 |
| A8 = | 4.8118E−02 | 8.8790E+01 | 6.5349E−02 | −1.7310E−02 |
| A10 = | −1.4059E−02 | −2.4126E+02 | −2.2676E−02 | 3.5598E−03 |
| A12 = | −1.4943E−03 | 4.3784E+02 | 4.7688E−03 | −5.4558E−04 |
| A14 = | 2.8065E−03 | −4.9716E+02 | −6.4374E−04 | 5.9065E−05 |
| A16 = | −1.0053E−03 | 3.2102E+02 | 5.4250E−05 | −4.1889E−06 |
| A18 = | 1.6826E−04 | −1.0246E+02 | −2.5777E−06 | 1.7168E−07 |
| A20 = | −1.1365E−05 | 1.1611E+01 | 5.2377E−08 | −3.0471E−09 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.91 | $|f/f3|$ | 0.905 |
| Fno | 1.80 | $|f/f4|$ | 0.296 |
| HFOV [deg.] | 43.2 | $|f/f5|$ | 0.214 |
| Vmin | 18.7 | $|f/f6|$ | 0.003 |
| (V2 + V4 + V5)/3 | 31.64 | $|f/f7|$ | 0.221 |
| ATmax/ATmin | 10.36 | $\Sigma|f/fi| \times Fno$ | 3.68 |
| CTmax/CTmin | 3.88 | $f^2/(R1 \times R2)$ | 1.26 |
| TL/f | 1.41 | $f^2/(R3 \times R4)$ | 2.07 |
| BL/f | 0.23 | $f^2/(R5 \times R6)$ | −0.73 |

-continued

2nd Embodiment

| | | | |
|---|---|---|---|
| TD/ImgH | 1.23 | f²/(R7 × R8) | 1.12 |
| R10/f | 1.26 | f²/(R9 × R10) | 0.94 |
| R5/R9 | 1.34 | f²/(R11 × R12) | 1.21 |
| R14/T67 | 4.27 | f²/(R13 × R14) | 8.20 |
| f/R12 | 1.14 | (|P3| + |P4| + |P5| + |P6|)/ | 2.26 |
| | | (|P1| + |P2| + |P7|) | |
| f/EPD | 1.80 | TD/SD | 1.00 |
| Σ|f/fi| | 2.045 | Yp7x/f, x = 1 | 0.15 |
| |f/f1| | 0.252 | Yp7x/f, x = 2 | 0.19 |
| |f/f2| | 0.154 | — | — |

3rd Embodiment

Figure 5:
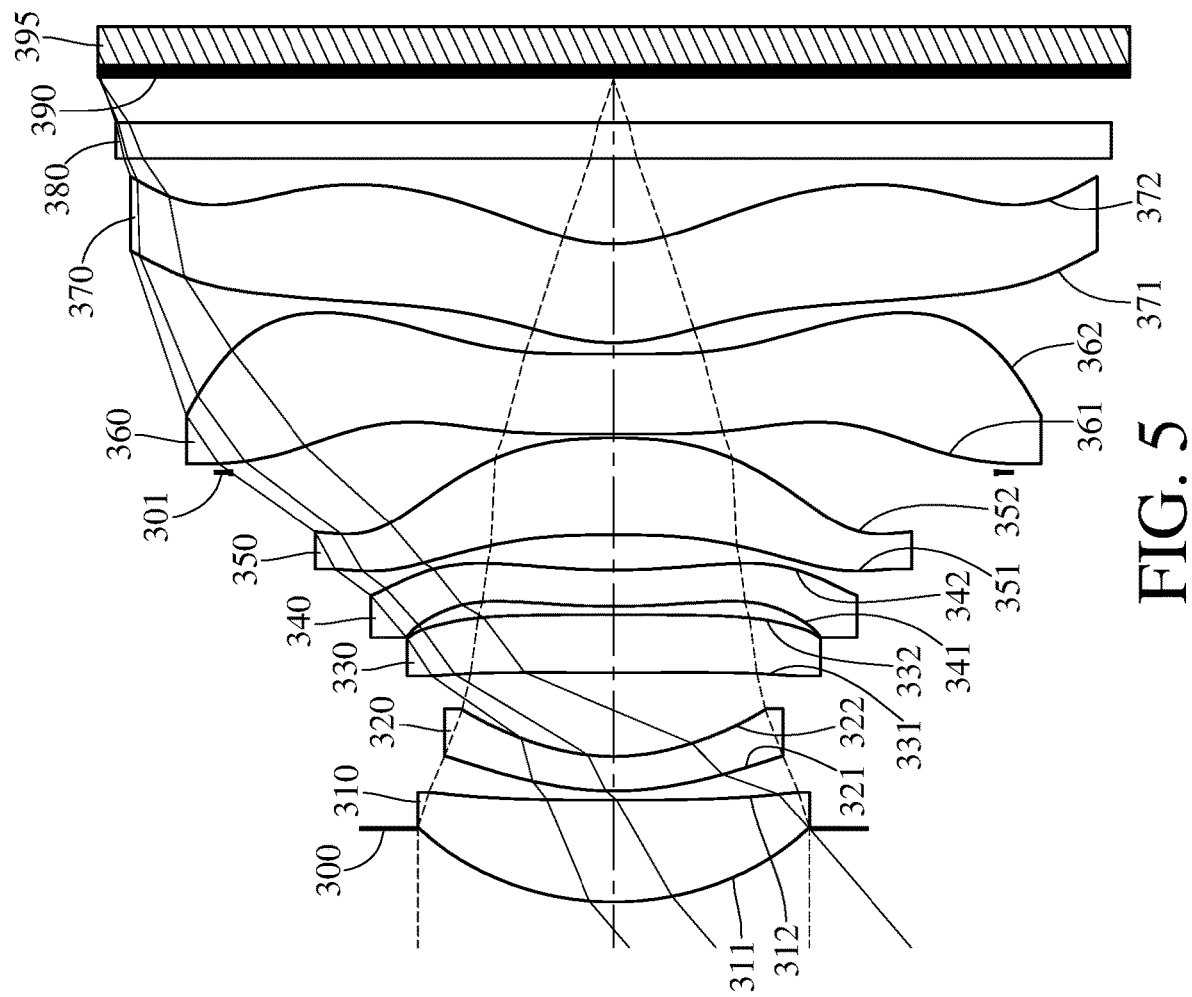
FIG. 5 is a schematic view of an image capturing unit according to the 3rd embodiment of the present disclosure.
Figure 6:
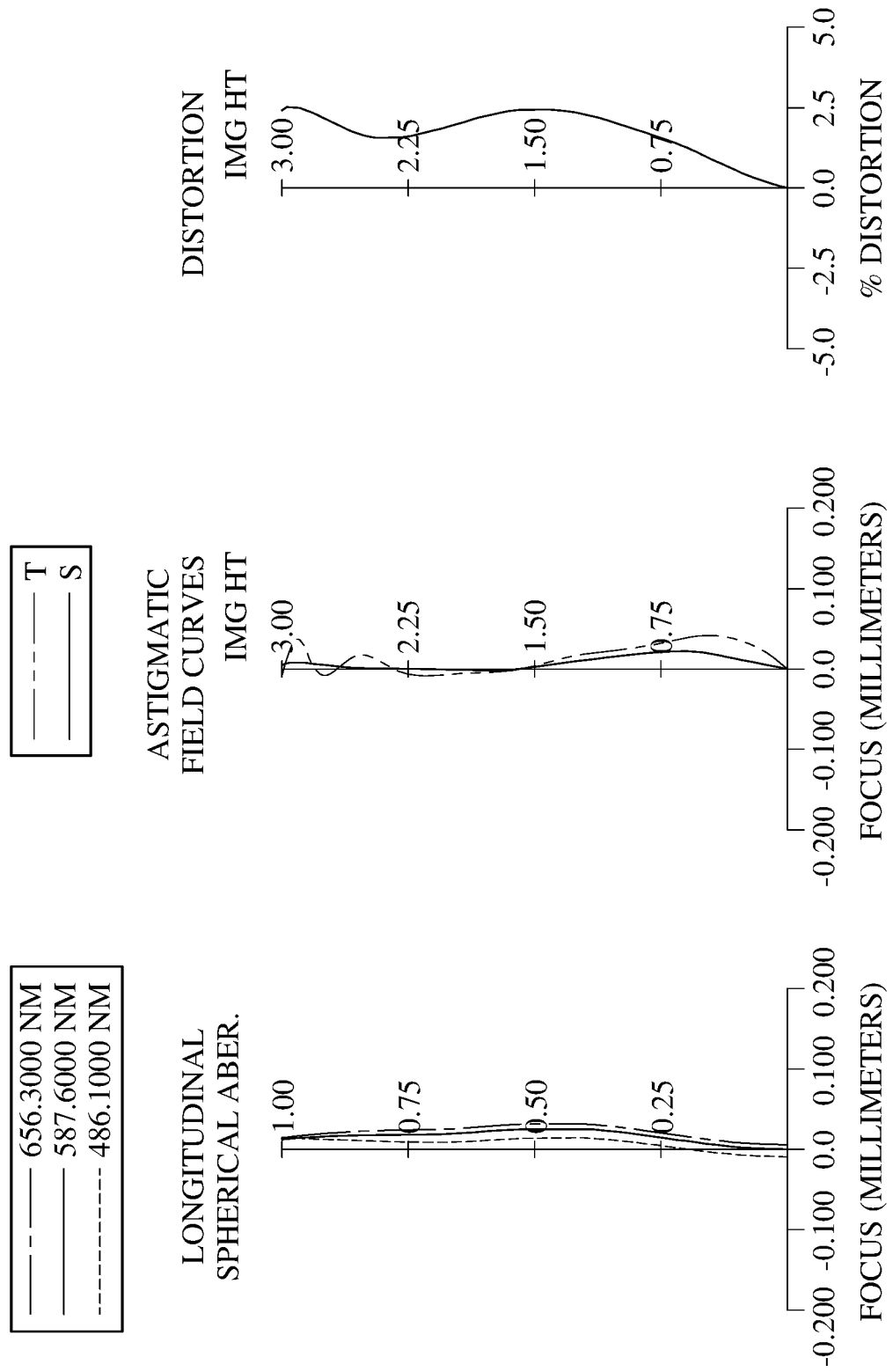
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical photographing lens assembly (its reference numeral is omitted) of the present disclosure and an image sensor 395. The optical photographing lens assembly includes, in order from an object side to an image side, an aperture stop 300, a first lens element 310, a second lens element 320, a third lens element 330, a fourth lens element 340, a fifth lens element 350, a stop 301, a sixth lens element 360, a seventh lens element 370, a filter 380 and an image surface 390. The optical photographing lens assembly includes seven single and non-cemented lens elements (310, 320, 330, 340, 350, 360 and 370) with no additional lens element disposed between each of the adjacent seven lens elements, wherein there is an air gap in a paraxial region between every adjacent lens element.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of plastic material and has the object-side surface 331 and the image-side surface 332 being both aspheric.

The fourth lens element 340 with negative refractive power has an object-side surface 341 being convex in a paraxial region thereof and an image-side surface 342 being concave in a paraxial region thereof. The fourth lens element 340 is made of plastic material and has the object-side surface 341 and the image-side surface 342 being both aspheric.

The fifth lens element 350 with positive refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric.

The sixth lens element 360 with negative refractive power has an object-side surface 361 being concave in a paraxial region thereof and an image-side surface 362 being convex in a paraxial region thereof. The sixth lens element 360 is made of plastic material and has the object-side surface 361 and the image-side surface 362 being both aspheric. The image-side surface 362 of the sixth lens element 360 has at least one critical point. Each of the object-side surface 361 and the image-side surface 362 of the sixth lens element 360 has at least one inflection point.

The seventh lens element 370 with positive refractive power has an object-side surface 371 being convex in a paraxial region thereof and an image-side surface 372 being concave in a paraxial region thereof. The seventh lens element 370 is made of plastic material and has the object-side surface 371 and the image-side surface 372 being both aspheric. Each of the object-side surface 371 and the image-side surface 372 of the seventh lens element 370 has at least one inflection point.

The filter 380 is made of glass material and located between the seventh lens element 370 and the image surface 390, and will not affect the focal length of the optical photographing lens assembly. The image sensor 395 is disposed on or near the image surface 390 of the optical photographing lens assembly.

In this embodiment, there are a total of eleven inflection points on the object-side surface 361 and the image-side surface 362 of the sixth lens element 160, and the object-side surface 371 and the image-side surface 372 of the seventh lens element 370.

The detailed optical data of the 3rd embodiment are shown in Table 5 and the aspheric surface data are shown in Table 6 below.

TABLE 5

3rd Embodiment
f = 3.40 mm, Fno = 1.49, HFOV = 40.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.427 | | | | |
| 2 | Lens 1 | 1.803 | (ASP) | 0.597 | Plastic | 1.545 | 56.0 | 3.40 |
| 3 | | 59.277 | (ASP) | 0.053 | | | | |
| 4 | Lens 2 | 1.893 | (ASP) | 0.200 | Plastic | 1.669 | 19.5 | −6.97 |
| 5 | | 1.290 | (ASP) | 0.489 | | | | |
| 6 | Lens 3 | 191.783 | (ASP) | 0.337 | Plastic | 1.544 | 56.0 | 43.28 |
| 7 | | −26.821 | (ASP) | 0.049 | | | | |
| 8 | Lens 4 | 4.582 | (ASP) | 0.211 | Plastic | 1.669 | 19.5 | −49.81 |
| 9 | | 3.953 | (ASP) | 0.205 | | | | |

TABLE 5-continued

3rd Embodiment
f = 3.40 mm, Fno = 1.49, HFOV = 40.7 deg.

| Surface # | | Curvature Radius | | Thickness | Material | Index | Abbe # | Focal Length |
|---|---|---|---|---|---|---|---|---|
| 10 | Lens 5 | −9.000 | (ASP) | 0.568 | Plastic | 1.544 | 56.0 | 9.85 |
| 11 | | −3.434 | (ASP) | −0.200 | | | | |
| 12 | Stop | Plano | | 0.222 | | | | |
| 13 | Lens 6 | −24.727 | (ASP) | 0.468 | Plastic | 1.511 | 56.8 | −1088.11 |
| 14 | | −26.044 | (ASP) | 0.064 | | | | |
| 15 | Lens 7 | 1.117 | (ASP) | 0.576 | Plastic | 1.544 | 56.0 | 176.67 |
| 16 | | 0.925 | (ASP) | 0.500 | | | | |
| 17 | Filter | Plano | | 0.210 | Glass | 1.517 | 64.2 | — |
| 18 | | Plano | | 0.262 | | | | |
| 19 | Image | Plano | | — | | | | |

Note:
Reference wavelength is 587.6 nm (d-line).
An effective radius of the stop 301 (Surface 12) is 2.230 mm.

TABLE 6

Aspheric Coefficients

| | Surface # | | | | |
|---|---|---|---|---|---|
| | 2 | 3 | 4 | 5 | 6 |
| k = | 7.4681E−02 | −9.0000E+01 | −3.4374E+00 | −2.8300E+00 | −9.0000E+01 |
| A4 = | 1.0030E−02 | 4.8037E−02 | −4.9737E−02 | −1.5136E−02 | −3.7981E−03 |
| A6 = | −1.0336E−02 | −2.2820E−02 | 1.1321E−01 | 1.3744E−01 | 1.8037E−02 |
| A8 = | 3.3820E−02 | −1.2334E−02 | −2.0650E−01 | −2.4396E−01 | −1.4580E−01 |
| A10 = | −4.5371E−02 | 3.5294E−02 | 2.2139E−01 | 3.0569E−01 | 2.2794E−01 |
| A12 = | 3.2350E−02 | −2.2706E−02 | −1.2731E−01 | −2.0381E−01 | −1.6084E−01 |
| A14 = | −8.7302E−03 | 3.6251E−03 | 2.6645E−02 | 5.7214E−02 | 4.6316E−02 |

| | Surface # | | | | |
|---|---|---|---|---|---|
| | 7 | 8 | 9 | 10 | 11 |
| k = | 9.0000E+01 | −2.6200E+00 | −1.2483E+01 | −1.8802E−01 | 9.0914E−02 |
| A4 = | 5.4120E−02 | −4.7915E−02 | −8.6871E−02 | −2.4020E−01 | −3.9219E−01 |
| A6 = | −2.0871E−01 | −1.0881E−01 | 4.8874E−02 | 3.3092E−01 | 5.8536E−01 |
| A8 = | 2.9233E−01 | 6.1315E−03 | −7.9905E−02 | −2.8070E−01 | −6.1828E−01 |
| A10 = | −3.6543E−01 | 8.2075E−02 | −4.2645E−03 | 1.4744E−01 | 3.9443E−01 |
| A12 = | 2.6926E−01 | −2.3599E−01 | 5.3922E−02 | −3.9775E−02 | −1.3504E−01 |
| A14 = | −7.7266E−02 | 2.4449E−01 | −2.7784E−01 | 4.1712E−03 | 2.3135E−02 |
| A16 = | — | −7.9640E−02 | 4.4200E−03 | — | −1.5655E−03 |

| | Surface # | | | |
|---|---|---|---|---|
| | 13 | 14 | 15 | 16 |
| k = | −6.0355E+01 | −5.9019E+01 | −4.4794E+00 | −3.7169E+00 |
| A4 = | 2.1055E−01 | 2.7153E−01 | −1.9039E−01 | −1.1602E−01 |
| A6 = | −1.8477E−01 | −2.1690E−01 | 1.0722E−01 | 5.0634E−02 |
| A8 = | 6.3078E−02 | 8.9186E−02 | −3.2281E−02 | −1.6334E−02 |
| A10 = | −1.0718E−02 | −2.2162E−02 | 5.7271E−03 | 3.2216E−03 |
| A12 = | 9.1284E−04 | 3.2851E−03 | −5.9452E−04 | −3.5034E−04 |
| A14 = | −3.1185E−05 | −2.7062E−04 | 3.3743E−05 | 1.9818E−05 |
| A16 = | — | 9.6008E−06 | −8.1962E−07 | −4.7028E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.40 | |f/f3| | 0.078 |
| Fno | 1.49 | |f/f4| | 0.068 |
| HFOV [deg.] | 40.7 | |f/f5| | 0.345 |
| Vmin | 19.5 | |f/f6| | 0.003 |
| (V2 + V4 + V5)/3 | 31.63 | |f/f7| | 0.019 |
| ATmax/ATmin | 22.23 | Σ|f/fi| × Fno | 2.98 |
| CTmax/CTmin | 2.99 | f²/(R1 × R2) | 0.11 |
| TL/f | 1.42 | f²/(R3 × R4) | 4.72 |

-continued

3rd Embodiment

| BL/f | 0.29 | f²/(R5 × R6) | −0.0022 |
|---|---|---|---|
| TD/ImgH | 1.28 | f²/(R7 × R8) | 0.64 |
| R10/f | −1.01 | f²/(R9 × R10) | 0.37 |
| R5/R9 | −21.31 | f²/(R11 × R12) | 0.02 |
| R14/T67 | 14.46 | f²/(R13 × R14) | 11.16 |
| f/R12 | −0.13 | (\|P3\| + \|P4\| + \|P5\| + \|P6\|)/(\|P1\| + \|P2\| + \|P7\|) | 0.33 |
| f/EPD | 1.49 | TD/SD | 1.13 |
| Σ\|f/fi\| | 1.999 | Yp7x/f, x = 1 | 0.15 |
| \|f/f1\| | 0.998 | Yp7x/f, x = 2 | 0.18 |
| \|f/f2\| | 0.487 | — | — |

4th Embodiment

Figure 7:
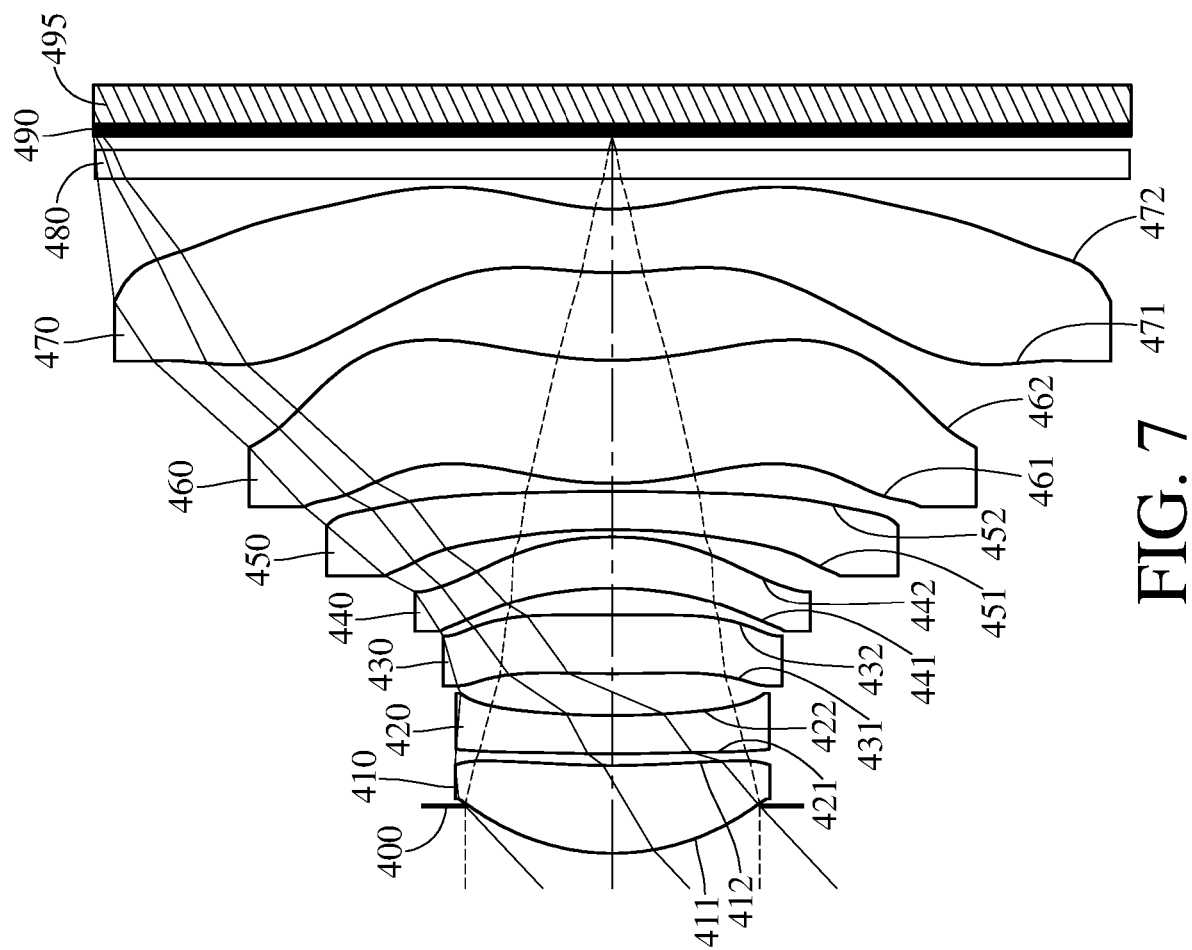
FIG. 7 is a schematic view of an image capturing unit according to the 4th embodiment of the present disclosure.
Figure 8:
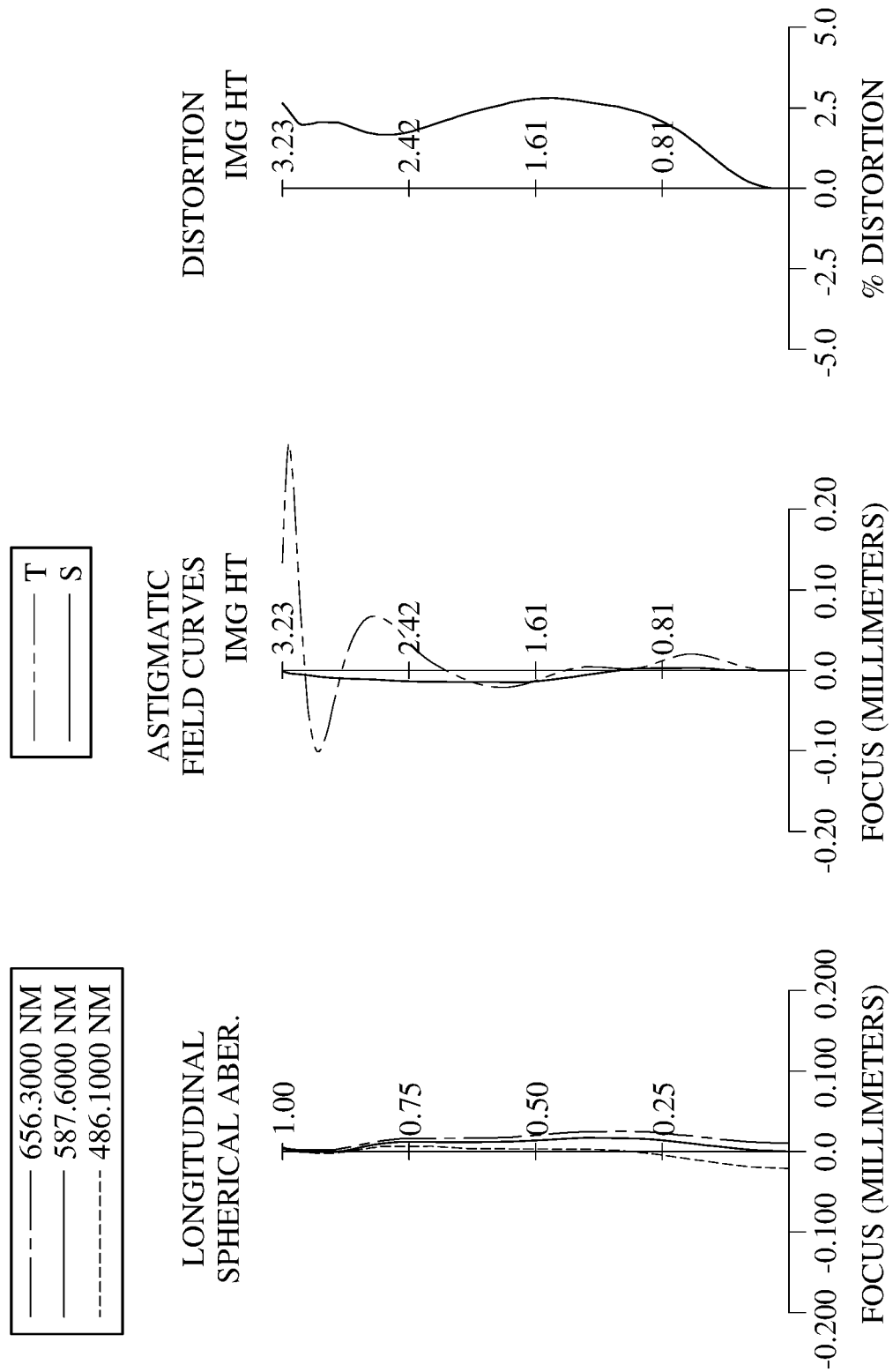
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical photographing lens assembly (its reference numeral is omitted) of the present disclosure and an image sensor 495. The optical photographing lens assembly includes, in order from an object side to an image side, an aperture stop 400, a first lens element 410, a second lens element 420, a third lens element 430, a fourth lens element 440, a fifth lens element 450, a sixth lens element 460, a seventh lens element 470, a filter 480 and an image surface 490. The optical photographing lens assembly includes seven single and non-cemented lens elements (410, 420, 430, 440, 450, 460 and 470) with no additional lens element disposed between each of the adjacent seven lens elements, wherein there is an air gap in a paraxial region between every adjacent lens element.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of plastic material and has the object-side surface 431 and the image-side surface 432 being both aspheric.

The fourth lens element 440 with negative refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with positive refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric.

The sixth lens element 460 with positive refractive power has an object-side surface 461 being convex in a paraxial region thereof and an image-side surface 462 being concave in a paraxial region thereof. The sixth lens element 460 is made of plastic material and has the object-side surface 461 and the image-side surface 462 being both aspheric. The image-side surface 462 of the sixth lens element 460 has at least one critical point. Each of the object-side surface 461 and the image-side surface 462 of the sixth lens element 460 has at least one inflection point.

The seventh lens element 470 with negative refractive power has an object-side surface 471 being convex in a paraxial region thereof and an image-side surface 472 being concave in a paraxial region thereof. The seventh lens element 470 is made of plastic material and has the object-side surface 471 and the image-side surface 472 being both aspheric. Each of the object-side surface 471 and the image-side surface 472 of the seventh lens element 470 has at least one inflection point.

The filter 480 is made of glass material and located between the seventh lens element 470 and the image surface 490, and will not affect the focal length of the optical photographing lens assembly. The image sensor 495 is disposed on or near the image surface 490 of the optical photographing lens assembly.

In this embodiment, there are a total of fourteen inflection points on the object-side surface 461 and the image-side surface 462 of the sixth lens element 460, and the object-side surface 471 and the image-side surface 472 of the seventh lens element 470.

The detailed optical data of the 4th embodiment are shown in Table 7 and the aspheric surface data are shown in Table 8 below.

TABLE 7

4th Embodiment
f = 3.35 mm, Fno = 1.82, HFOV = 43.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.296 | | | | |
| 2 | Lens 1 | 1.495 | (ASP) | 0.549 | Plastic | 1.544 | 55.9 | 3.73 |
| 3 | | 4.950 | (ASP) | 0.073 | | | | |
| 4 | Lens 2 | 7.118 | (ASP) | 0.240 | Plastic | 1.660 | 20.4 | −19.40 |
| 5 | | 4.513 | (ASP) | 0.262 | | | | |
| 6 | Lens 3 | 8.756 | (ASP) | 0.367 | Plastic | 1.544 | 55.9 | 15.86 |

TABLE 7-continued

4th Embodiment
f = 3.35 mm, Fno = 1.82, HFOV = 43.1 deg.

| Surface # | | Curvature Radius | Thickness | Material | Index | Abbe # | Focal Length |
|---|---|---|---|---|---|---|---|
| 7 | | −564.535 (ASP) | 0.171 | | | | |
| 8 | Lens 4 | −2.054 (ASP) | 0.320 | Plastic | 1.584 | 28.2 | −331.70 |
| 9 | | −2.196 (ASP) | 0.044 | | | | |
| 10 | Lens 5 | −8.489 (ASP) | 0.242 | Plastic | 1.669 | 19.5 | 340.09 |
| 11 | | −8.277 (ASP) | 0.050 | | | | |
| 12 | Lens 6 | 2.378 (ASP) | 0.768 | Plastic | 1.544 | 55.9 | 344.70 |
| 13 | | 2.135 (ASP) | 0.549 | | | | |
| 14 | Lens 7 | 2.376 (ASP) | 0.398 | Plastic | 1.566 | 37.4 | −9.19 |
| 15 | | 1.532 (ASP) | 0.190 | | | | |
| 16 | Filter | Plano | 0.180 | Glass | 1.517 | 64.2 | — |
| 17 | | Plano | 0.085 | | | | |
| 18 | Image | Plano | — | | | | |

Note:
Reference wavelength is 587.6 nm (d-line).

TABLE 8

Aspheric Coefficients

| | Surface # | | | | |
|---|---|---|---|---|---|
| | 2 | 3 | 4 | 5 | 6 |
| k = | −8.1446E−01 | −4.7079E+01 | 6.2918E+00 | −4.7528E−01 | −6.3592E+01 |
| A4 = | 2.8138E−02 | −9.6169E−02 | −2.2265E−01 | −1.4169E−01 | −1.8634E−01 |
| A6 = | 1.0401E−02 | −7.6591E−03 | 2.5879E−01 | 3.5795E−01 | 3.5813E−01 |
| A8 = | 2.0055E−02 | 7.4889E−01 | 5.9818E−01 | −3.7258E−01 | −2.3159E+00 |
| A10 = | −5.0648E−02 | −2.3836E+00 | −2.6492E+00 | 5.2815E−01 | 7.3776E+00 |
| A12 = | 1.7204E−02 | 3.6347E+00 | 4.3821E+00 | −1.0330E+00 | −1.2410E+01 |
| A14 = | 6.5058E−02 | −2.8495E+00 | −3.5307E+00 | 1.2012E+00 | 1.0325E+01 |
| A16 = | −6.9104E−02 | 8.7525E−01 | 1.1227E+00 | −4.7102E−01 | −3.2763E+00 |

| | Surface # | | | | |
|---|---|---|---|---|---|
| | 7 | 8 | 9 | 10 | 11 |
| k = | 9.0000E+01 | 1.2239E+00 | −3.8833E+00 | 2.5577E+01 | −1.7187E+01 |
| A4 = | 2.6825E−02 | 3.1063E−01 | −4.2726E−01 | −4.3090E−01 | 1.6589E−01 |
| A6 = | −5.2015E−01 | −9.2954E−01 | 1.0152E+00 | 1.3719E+00 | −3.4576E−01 |
| A8 = | 3.9136E−01 | 6.1385E−01 | −1.7874E+00 | −2.2321E+00 | 3.6167E−01 |
| A10 = | 6.5758E−01 | 1.4305E+00 | 2.1604E+00 | 2.1513E+00 | −2.1634E−01 |
| A12 = | −1.6023E+00 | −2.7937E+00 | −1.5159E+00 | −1.2509E+00 | 7.1859E−02 |
| A14 = | 1.2341E+00 | 1.9000E+00 | 5.5342E−01 | 3.9897E−01 | −1.2019E−02 |
| A16 = | −3.1217E−01 | −4.7914E−01 | −8.0679E−02 | −5.2801E−02 | 7.6274E−04 |

| | Surface # | | | |
|---|---|---|---|---|
| | 12 | 13 | 14 | 15 |
| k = | −1.0479E+00 | −3.1236E+01 | −2.6699E+00 | −5.2412E+00 |
| A4 = | 4.2476E−02 | 6.6852E−02 | −3.8875E−01 | −1.3692E−01 |
| A6 = | −3.1199E−01 | −1.0743E−01 | 2.1511E−01 | 3.0022E−02 |
| A8 = | 2.9504E−01 | 5.0811E−02 | −6.9327E−02 | 2.3085E−02 |
| A10 = | −1.5183E−01 | −1.3364E−02 | 1.3924E−02 | −1.9454E−03 |
| A12 = | 4.4181E−02 | 1.6140E−03 | −1.6657E−03 | 3.1090E−04 |
| A14 = | −6.5866E−03 | −1.4576E−05 | 1.0779E−04 | −2.0809E−05 |
| A16 = | 3.8337E−04 | −8.1483E−06 | −2.9032E−06 | 5.0392E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.35 | |f/f3| | 0.211 |
| Fno | 1.82 | |f/f4| | 0.010 |

-continued

| 4th Embodiment | | | |
|---|---|---|---|
| HFOV [deg.] | 43.1 | \|f/f5\| | 0.010 |
| Vmin | 19.5 | \|f/f6\| | 0.010 |
| (V2 + V4 + V5)/3 | 22.69 | \|f/f7\| | 0.365 |
| ATmax/ATmin | 12.33 | Σ\|f/fi\| × Fno | 3.05 |
| CTmax/CTmin | 3.20 | f²/(R1 × R2) | 1.52 |
| TL/f | 1.34 | f²/(R3 × R4) | 0.35 |
| BL/f | 0.14 | f²/(R5 × R6) | −0.0023 |
| TD/ImgH | 1.25 | f²/(R7 × R8) | 2.49 |
| R10/f | −2.47 | f²/(R9 × R10) | 0.16 |
| R5/R9 | −1.03 | f²/(R11 × R12) | 2.21 |
| R14/T67 | 2.79 | f²/(R13 × R14) | 3.09 |
| f/R12 | 1.57 | (\|P3\| + \|P4\| + \|P5\| + \|P6\|)/(\|P1\| + \|P2\| + \|P7\|) | 0.17 |
| f/EPD | 1.82 | TD/SD | 1.08 |
| Σ\|f/fi\| | 1.677 | Yp7x/f, x = 1 | 0.10 |
| \|f/f1\| | 0.898 | Yp7x/f, x = 2 | 0.16 |
| \|f/f2\| | 0.173 | — | — |

5th Embodiment

Figure 9:
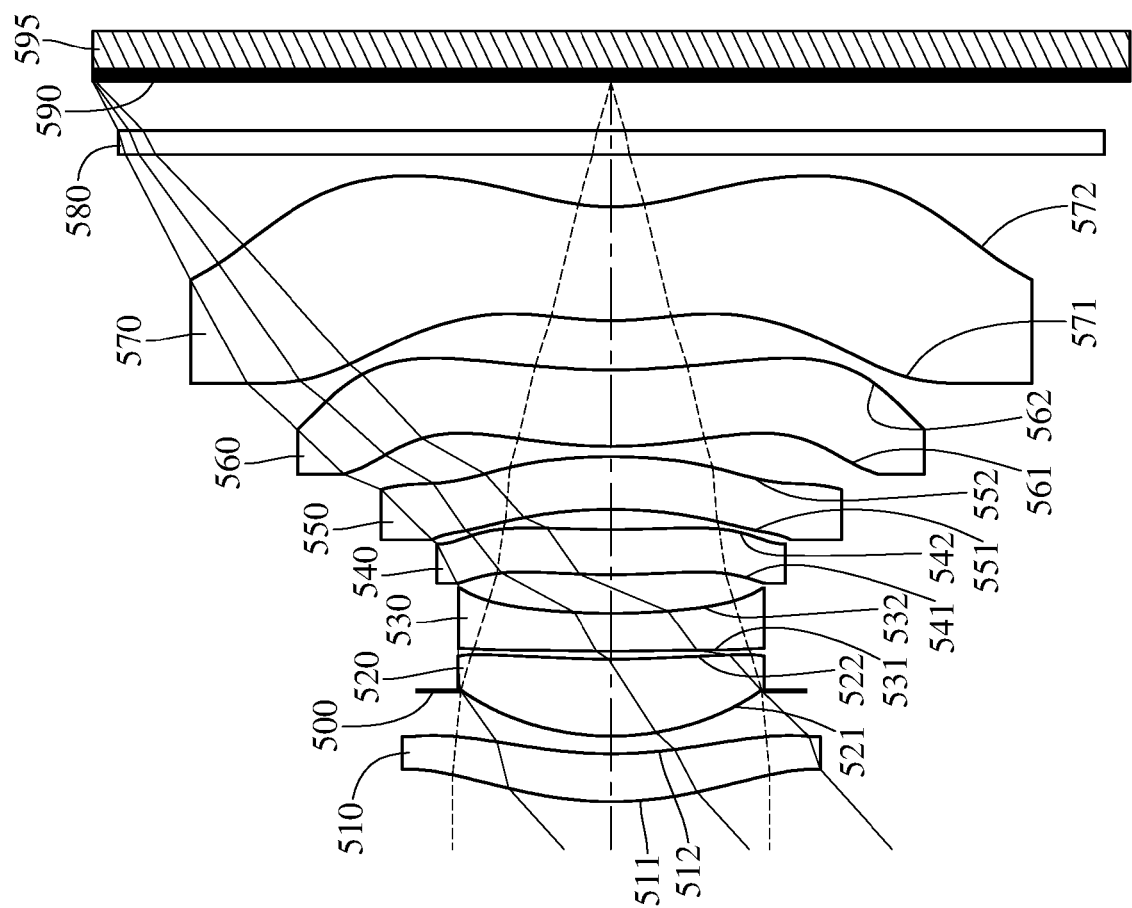
FIG. 9 is a schematic view of an image capturing unit according to the 5th embodiment of the present disclosure.
Figure 10:
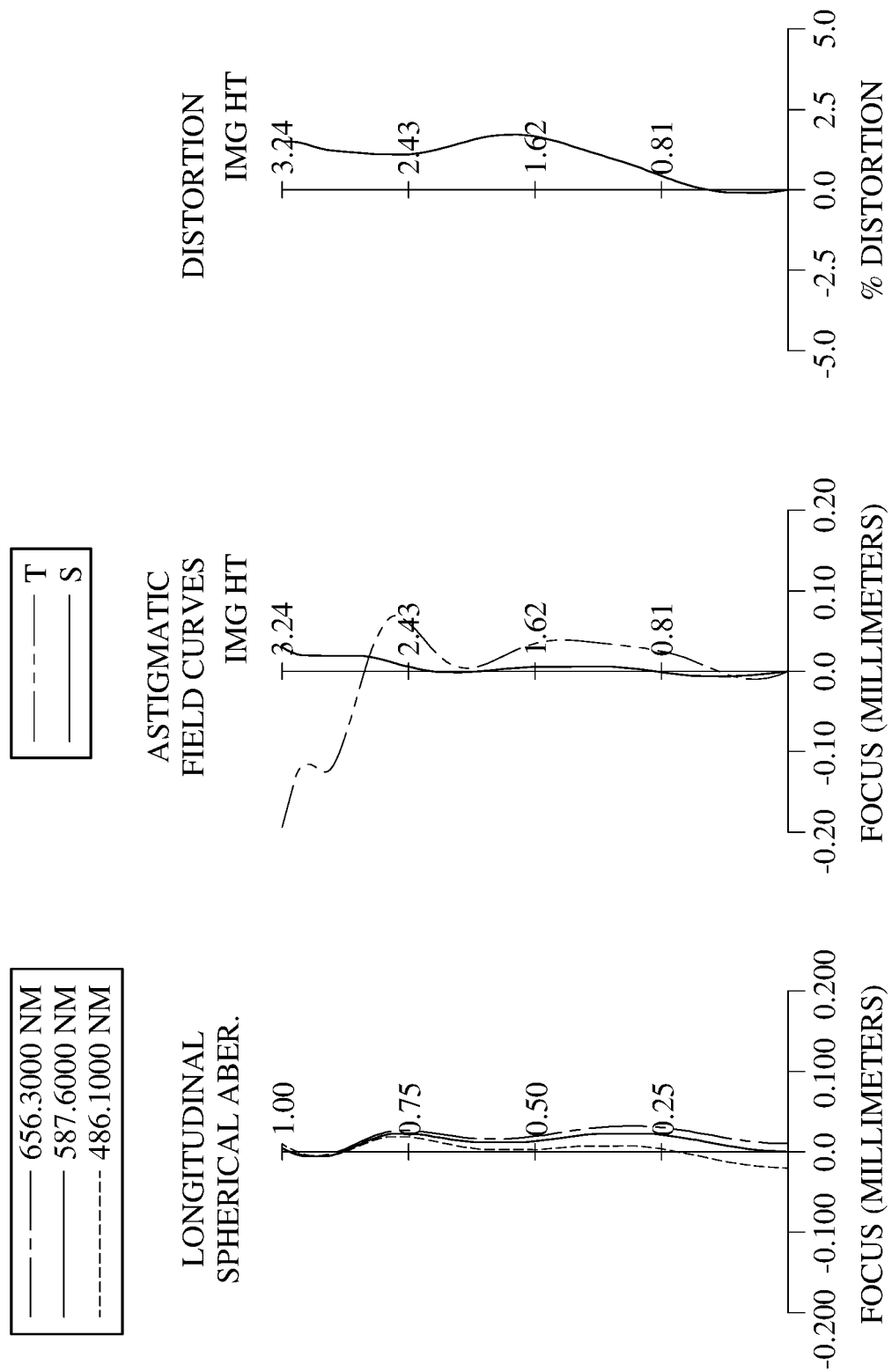
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical photographing lens assembly (its reference numeral is omitted) of the present disclosure and an image sensor 595. The optical photographing lens assembly includes, in order from an object side to an image side, a first lens element 510, an aperture stop 500, a second lens element 520, a third lens element 530, a fourth lens element 540, a fifth lens element 550, a sixth lens element 560, a seventh lens element 570, a filter 580 and an image surface 590. The optical photographing lens assembly includes seven single and non-cemented lens elements (510, 520, 530, 540, 550, 560 and 570) with no additional lens element disposed between each of the adjacent seven lens elements, wherein there is an air gap in a paraxial region between every adjacent lens element.

The first lens element 510 with positive refractive power has an object-side surface 511 being convex in a paraxial region thereof and an image-side surface 512 being concave in a paraxial region thereof. The first lens element 510 is made of glass material and has the object-side surface 511 and the image-side surface 512 being both aspheric.

The second lens element 520 with positive refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric.

The fourth lens element 540 with positive refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric.

The fifth lens element 550 with negative refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric.

The sixth lens element 560 with positive refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric. The image-side surface 562 of the sixth lens element 560 has at least one critical point. Each of the object-side surface 561 and the image-side surface 562 of the sixth lens element 560 has at least one inflection point.

The seventh lens element 570 with negative refractive power has an object-side surface 571 being convex in a paraxial region thereof and an image-side surface 572 being concave in a paraxial region thereof. The seventh lens element 570 is made of plastic material and has the object-side surface 571 and the image-side surface 572 being both aspheric. Each of the object-side surface 571 and the image-side surface 572 of the seventh lens element 570 has at least one inflection point.

The filter 580 is made of glass material and located between the seventh lens element 570 and the image surface 590, and will not affect the focal length of the optical photographing lens assembly. The image sensor 595 is disposed on or near the image surface 590 of the optical photographing lens assembly.

In this embodiment, there are a total of nine inflection points on the object-side surface 561 and the image-side surface 562 of the sixth lens element 560, and the object-side surface 571 and the image-side surface 572 of the seventh lens element 570.

The detailed optical data of the 5th embodiment are shown in Table 9 and the aspheric surface data are shown in Table 10 below.

TABLE 9

5th Embodiment
f = 3.51 mm, Fno = 1.77, HFOV = 42.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.260 | (ASP) | 0.299 | Glass | 1.804 | 46.5 | 13.18 |
| 2 | | 2.703 | (ASP) | 0.394 | | | | |
| 3 | Ape. Stop | Plano | | −0.284 | | | | |
| 4 | Lens 2 | 1.712 | (ASP) | 0.481 | Plastic | 1.544 | 56.0 | 4.39 |
| 5 | | 5.448 | (ASP) | 0.050 | | | | |

TABLE 9-continued

5th Embodiment
f = 3.51 mm, Fno = 1.77, HFOV = 42.2 deg.

| Surface # | | Curvature Radius | | Thickness | Material | Index | Abbe # | Focal Length |
|---|---|---|---|---|---|---|---|---|
| 6 | Lens 3 | 8.769 | (ASP) | 0.240 | Plastic | 1.688 | 18.7 | −11.57 |
| 7 | | 4.126 | (ASP) | 0.242 | | | | |
| 8 | Lens 4 | 4.355 | (ASP) | 0.282 | Plastic | 1.544 | 56.0 | 27.86 |
| 9 | | 5.970 | (ASP) | 0.126 | | | | |
| 10 | Lens 5 | −2.950 | (ASP) | 0.330 | Plastic | 1.584 | 28.2 | −121.42 |
| 11 | | −3.206 | (ASP) | 0.064 | | | | |
| 12 | Lens 6 | 3.064 | (ASP) | 0.477 | Plastic | 1.544 | 56.0 | 57.27 |
| 13 | | 3.212 | (ASP) | 0.312 | | | | |
| 14 | Lens 7 | 1.958 | (ASP) | 0.712 | Plastic | 1.544 | 56.0 | −12.33 |
| 15 | | 1.321 | (ASP) | 0.326 | | | | |
| 16 | Filter | Plano | | 0.150 | Glass | 1.517 | 64.2 | — |
| 17 | | Plano | | 0.306 | | | | |
| 18 | Image | Plano | | — | | | | |

Note:
Reference wavelength is 587.6 nm (d-line).

TABLE 10

Aspheric Coefficients

| | Surface # | | | | |
|---|---|---|---|---|---|
| | 1 | 2 | 4 | 5 | 6 |
| k = | −4.2859E+00 | −9.1678E+00 | −4.5674E−01 | −6.2620E+01 | 4.3939E+01 |
| A4 = | −7.1414E−03 | −2.7960E−02 | 2.4830E−03 | −9.5032E−02 | −2.1710E−01 |
| A6 = | −1.3901E−02 | −1.9902E−02 | 1.7595E−02 | 5.9302E−03 | 2.5705E−01 |
| A8 = | −6.1777E−03 | 5.1976E−03 | 2.7113E−02 | 7.4611E−01 | 5.9215E−01 |
| A10 = | 5.9755E−04 | 1.9168E−03 | −4.6448E−02 | −2.3778E+00 | −2.6497E+00 |
| A12 = | 1.9493E−03 | 1.8850E−05 | 1.7648E−02 | 3.6336E+00 | 4.3807E+00 |
| A14 = | 4.9247E−04 | −4.2230E−04 | 5.9166E−02 | −2.8485E+00 | −3.5277E+00 |
| A16 = | −5.8646E−04 | −1.9685E−04 | −5.7837E−02 | 8.7911E−01 | 1.1162E+00 |

| | Surface # | | | | |
|---|---|---|---|---|---|
| | 7 | 8 | 9 | 10 | 11 |
| k = | 4.2467E+00 | −6.4967E+01 | −6.9174E+01 | 1.6987E+00 | −7.0645E+01 |
| A4 = | −1.1507E−01 | −2.2475E−01 | −1.6329E−01 | 8.3044E−02 | −1.5355E−01 |
| A6 = | 3.4842E−01 | 1.1735E+00 | 1.9156E−01 | −6.1515E−01 | −6.9029E−02 |
| A8 = | −3.6733E−01 | −5.8322E+00 | −5.0799E−01 | 1.9433E+00 | 2.1367E−01 |
| A10 = | 5.3081E−01 | 1.5391E+01 | 7.3486E−01 | −3.1757E+00 | 2.8635E−02 |
| A12 = | −1.0433E+00 | −2.2912E+01 | −9.1838E−01 | 3.0141E+00 | −1.5762E−01 |
| A14 = | 1.1946E+00 | 1.7645E+01 | 7.4202E−01 | −1.5141E+00 | 7.6027E−02 |
| A16 = | −4.8086E−01 | −5.3819E+00 | −2.1996E−01 | 3.0020E−01 | −1.1259E−02 |

| | Surface # | | | |
|---|---|---|---|---|
| | 12 | 13 | 14 | 15 |
| k = | −4.2028E−01 | −9.9000E+01 | −2.4245E+00 | −4.9771E+00 |
| A4 = | −1.5058E−01 | −1.1927E−02 | −4.6244E−01 | −1.5019E−01 |
| A6 = | −3.3908E+00 | 7.0401E−02 | 3.4907E−01 | 8.4486E−02 |
| A8 = | 1.1907E+01 | −1.0526E−01 | −1.7288E−01 | −3.3237E−02 |
| A10 = | −2.6142E+01 | 6.1439E−02 | 5.4605E−02 | 7.8985E−03 |
| A12 = | 3.1274E+01 | −1.9028E−02 | −1.0163E−02 | −1.1235E−03 |
| A14 = | −1.8196E+01 | 3.0460E−03 | 1.0121E−03 | 8.9882E−05 |
| A16 = | 4.0681E+00 | −1.9579E−04 | −4.1667E−05 | −3.1077E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 3.51 | |f/f3| | 0.303 |
| Fno | 1.77 | |f/f4| | 0.126 |

-continued

5th Embodiment

| | | | |
|---|---|---|---|
| HFOV [deg.] | 42.2 | \|f/f5\| | 0.029 |
| Vmin | 18.7 | \|f/f6\| | 0.061 |
| (V2 + V4 + V5)/3 | 46.72 | \|f/f7\| | 0.285 |
| ATmax/ATmin | 6.24 | Σ\|f/fi\| × Fno | 3.31 |
| CTmax/CTmin | 2.97 | $f^2$/(R1 × R2) | 2.02 |
| TL/f | 1.28 | $f^2$/(R3 × R4) | 1.32 |
| BL/f | 0.22 | $f^2$/(R5 × R6) | 0.34 |
| TD/ImgH | 1.15 | $f^2$/(R7 × R8) | 0.47 |
| R10/f | −0.91 | $f^2$/(R9 × R10) | 1.30 |
| R5/R9 | −2.97 | $f^2$/(R11 × R12) | 1.25 |
| R14/T67 | 4.23 | $f^2$/(R13 × R14) | 4.76 |
| f/R12 | 1.09 | (\|P3\| + \|P4\| + \|P5\| + \|P6\|)/(\|P1\| + \|P2\| + \|P7\|) | 0.38 |
| f/EPD | 1.77 | TD/SD | 1.23 |
| Σ\|f/fi\| | 1.871 | Yp7x/f, x = 1 | 0.09 |
| \|f/f1\| | 0.266 | Yp7x/f, x = 2 | 0.16 |
| \|f/f2\| | 0.800 | — | — |

6th Embodiment

Figure 11:
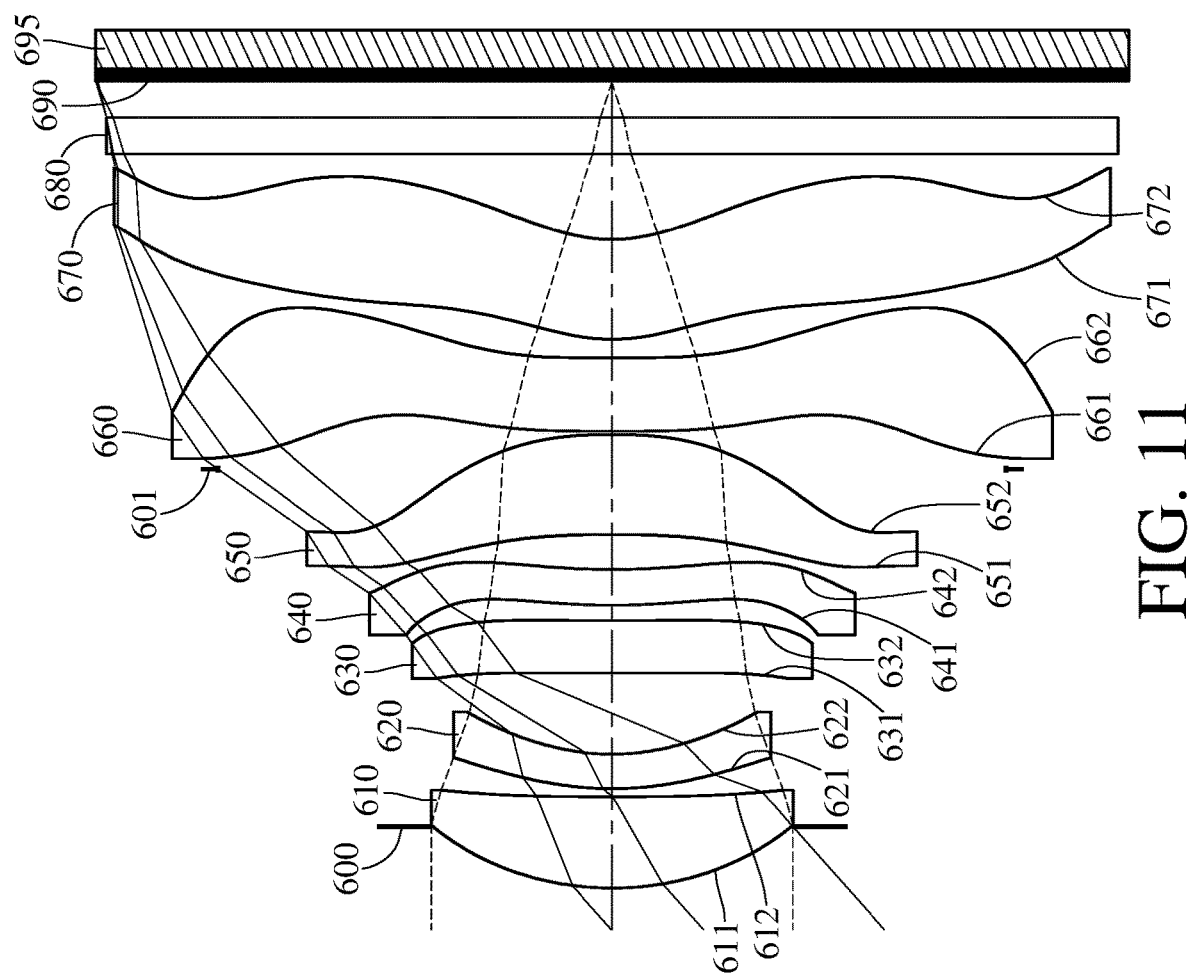
FIG. 11 is a schematic view of an image capturing unit according to the 6th embodiment of the present disclosure.
Figure 12:
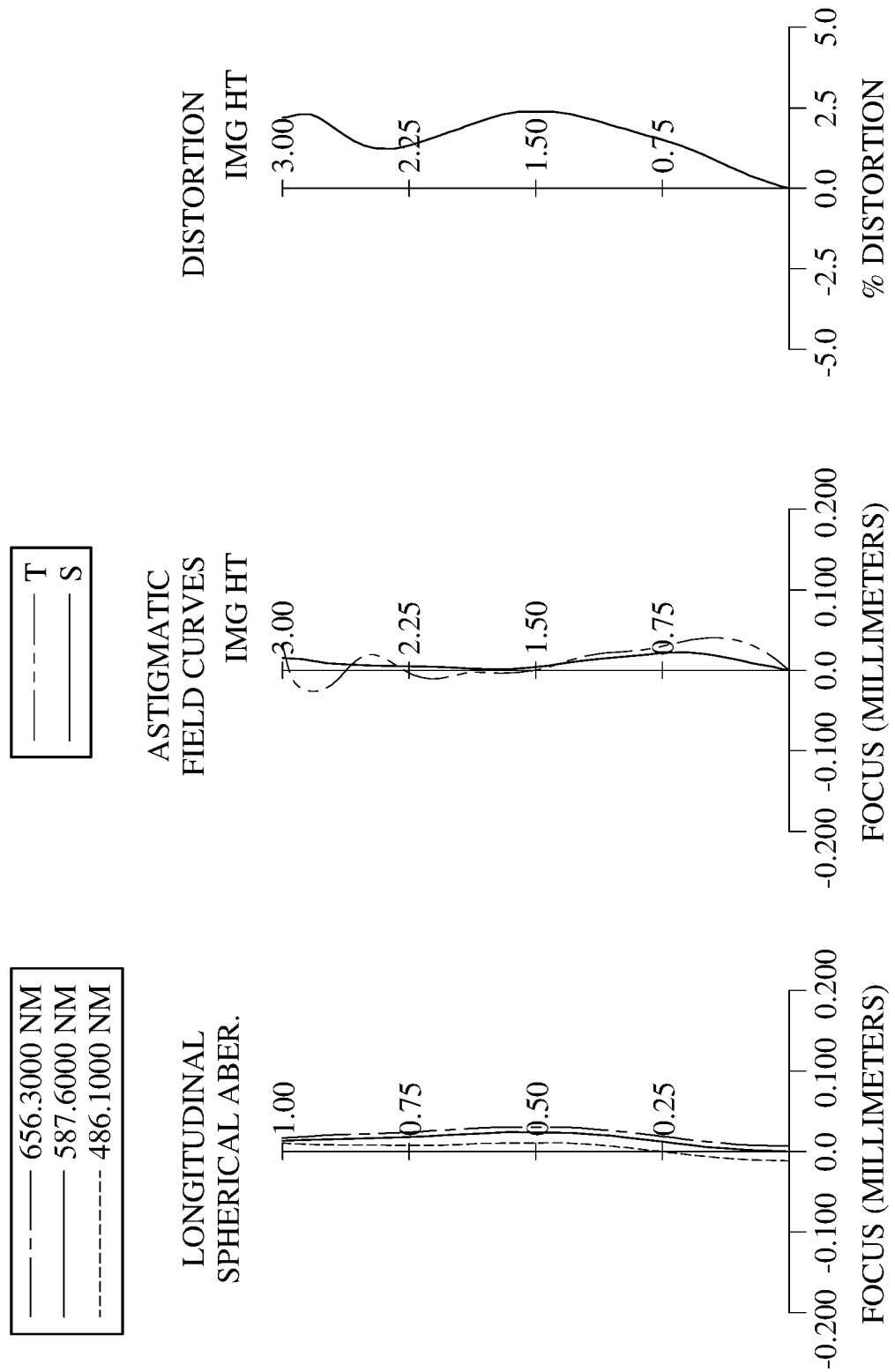
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical photographing lens assembly (its reference numeral is omitted) of the present disclosure and an image sensor 695. The optical photographing lens assembly includes, in order from an object side to an image side, an aperture stop 600, a first lens element 610, a second lens element 620, a third lens element 630, a fourth lens element 640, a fifth lens element 650, a stop 601, a sixth lens element 660, a seventh lens element 670, a filter 680 and an image surface 690. The optical photographing lens assembly includes seven single and non-cemented lens elements (610, 620, 630, 640, 650, 660 and 670) with no additional lens element disposed between each of the adjacent seven lens elements, wherein there is an air gap in a paraxial region between every adjacent lens element.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with negative refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric.

The fourth lens element 640 with negative refractive power has an object-side surface 641 being convex in a paraxial region thereof and an image-side surface 642 being concave in a paraxial region thereof. The fourth lens element 640 is made of plastic material and has the object-side surface 641 and the image-side surface 642 being both aspheric.

The fifth lens element 650 with positive refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric.

The sixth lens element 660 has an object-side surface 661 being planar in a paraxial region thereof and an image-side surface 662 being planar in a paraxial region thereof. The sixth lens element 660 is made of plastic material and has the object-side surface 661 and the image-side surface 662 being both aspheric. The image-side surface 662 of the sixth lens element 660 has at least one critical point. Each of the object-side surface 661 and the image-side surface 662 of the sixth lens element 660 has at least one inflection point.

The seventh lens element 670 with negative refractive power has an object-side surface 671 being convex in a paraxial region thereof and an image-side surface 672 being concave in a paraxial region thereof. The seventh lens element 670 is made of plastic material and has the object-side surface 671 and the image-side surface 672 being both aspheric. Each of the object-side surface 671 and the image-side surface 672 of the seventh lens element 670 has at least one inflection point.

The filter 680 is made of glass material and located between the seventh lens element 670 and the image surface 690, and will not affect the focal length of the optical photographing lens assembly. The image sensor 695 is disposed on or near the image surface 690 of the optical photographing lens assembly.

In this embodiment, there are a total of ten inflection points on the object-side surface 661 and the image-side surface 662 of the sixth lens element 660, and the object-side surface 671 and the image-side surface 672 of the seventh lens element 670.

The detailed optical data of the 6th embodiment are shown in Table 11 and the aspheric surface data are shown in Table 12 below.

TABLE 11

6th Embodiment
f = 3.30 mm, Fno = 1.57, HFOV = 41.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.356 | | | | |
| 2 | Lens 1 | 1.776 | (ASP) | 0.533 | Plastic | 1.545 | 56.0 | 3.41 |
| 3 | | 36.639 | (ASP) | 0.047 | | | | |
| 4 | Lens 2 | 1.935 | (ASP) | 0.200 | Plastic | 1.669 | 19.5 | −7.24 |
| 5 | | 1.325 | (ASP) | 0.472 | | | | |
| 6 | Lens 3 | 49.250 | (ASP) | 0.304 | Plastic | 1.544 | 56.0 | −3167.40 |

TABLE 11-continued

6th Embodiment
f = 3.30 mm, Fno = 1.57, HFOV = 41.6 deg.

| Surface # | | Curvature Radius | | Thickness | Material | Index | Abbe # | Focal Length |
|---|---|---|---|---|---|---|---|---|
| 7 | | 47.777 | (ASP) | 0.088 | | | | |
| 8 | Lens 4 | 3.889 | (ASP) | 0.209 | Plastic | 1.669 | 19.5 | −1156.25 |
| 9 | | 3.786 | (ASP) | 0.203 | | | | |
| 10 | Lens 5 | −11.428 | (ASP) | 0.583 | Plastic | 1.544 | 56.0 | 8.96 |
| 11 | | −3.477 | (ASP) | −0.200 | | | | |
| 12 | Stop | Plano | | 0.220 | | | | |
| 13 | Lens 6 | ∞ | (ASP) | 0.427 | Plastic | 1.511 | 56.8 | ∞ |
| 14 | | ∞ | (ASP) | 0.107 | | | | |
| 15 | Lens 7 | 1.100 | (ASP) | 0.579 | Plastic | 1.544 | 56.0 | −791.55 |
| 16 | | 0.894 | (ASP) | 0.500 | | | | |
| 17 | Filter | Plano | | 0.210 | Glass | 1.517 | 64.2 | — |
| 18 | | Plano | | 0.213 | | | | |
| 19 | Image | Plano | | — | | | | |

Note:
Reference wavelength is 587.6 nm (d-line).
An effective radius of the stop 601 (Surface 12) is 2.290 mm.

TABLE 12

Aspheric Coefficients

| Surface # | | | | |
|---|---|---|---|---|
| 2 | 3 | 4 | 5 | 6 |
| k = −4.2106E−01 | 2.9213E+00 | −3.2290E+00 | −2.7953E+00 | 1.7562E+01 |
| A4 = 2.3225E−02 | 4.2778E−02 | −5.3151E−02 | −1.7645E−02 | −1.9397E−02 |
| A6 = −7.4655E−03 | −1.8568E−02 | 1.1228E−01 | 1.3951E−01 | 1.6155E−02 |
| A8 = 3.2784E−02 | −1.4483E−02 | −2.0013E−01 | −2.3928E−01 | −1.4449E−01 |
| A10 = −4.3320E−02 | 3.5199E−02 | 2.2165E−01 | 3.0595E−01 | 2.2524E−01 |
| A12 = 3.3991E−02 | −2.1516E−02 | −1.3056E−01 | −2.0525E−01 | −1.6304E−01 |
| A14 = −1.0340E−02 | 2.2174E−03 | 2.6776E−02 | 5.8351E−02 | 4.7685E−02 |

| Surface # | | | | |
|---|---|---|---|---|
| 7 | 8 | 9 | 10 | 11 |
| k = −9.0000E+01 | −6.3484E+00 | −1.1604E+01 | 5.1192E+00 | −9.6573E−02 |
| A4 = 1.2858E−02 | −5.4980E−02 | −8.6871E−02 | −2.5518E−01 | −3.9895E−01 |
| A6 = −1.8890E−01 | −1.1889E−01 | 4.8874E−02 | 3.8819E−01 | 6.0026E−01 |
| A8 = 2.9619E−01 | 5.5016E−02 | −7.9905E−02 | −3.4054E−01 | −6.3057E−01 |
| A10 = −3.6788E−01 | −1.3129E−02 | −4.2645E−03 | 1.7375E−01 | 3.9768E−01 |
| A12 = 2.6644E−01 | −1.1518E−01 | 5.3922E−02 | −4.4901E−02 | −1.3493E−01 |
| A14 = −7.9827E−02 | 1.6639E−01 | −2.7784E−02 | 4.5141E−03 | 2.2983E−02 |
| A16 = — | −6.1634E−02 | 4.4200E−03 | — | −1.5520E−03 |

| Surface # | | | |
|---|---|---|---|
| 13 | 14 | 15 | 16 |
| k = 1.0194E+01 | −9.9000E+01 | −4.3370E+00 | −3.3974E+00 |
| A4 = 2.0589E−01 | 1.1294E+01 | −2.2160E−01 | −1.3730E−01 |
| A6 = −1.7938E−01 | −5.9563E+01 | 1.2888E−01 | 7.0505E−02 |
| A8 = 5.9658E−02 | 1.6018E+02 | −3.8121E−02 | −2.4357E−02 |
| A10 = −9.8481E−03 | −2.5506E+02 | 6.5762E−03 | 4.9060E−03 |
| A12 = 8.1460E−04 | 2.3859E+02 | −6.7006E−04 | −5.4684E−04 |
| A14 = −2.7051E−05 | −1.2333E+02 | 3.7870E−05 | 3.1967E−05 |
| A16 = — | 2.7513E+01 | −9.2650E−07 | −7.8050E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 3.30 | |f/f3| | 0.001 |
| Fno | 1.57 | |f/f4| | 0.003 |

-continued

6th Embodiment

| | | | |
|---|---|---|---|
| HFOV [deg.] | 41.6 | \|f/f5\| | 0.368 |
| Vmin | 19.5 | \|f/f6\| | 0.000 |
| (V2 + V4 + V5)/3 | 31.63 | \|f/f7\| | 0.004 |
| ATmax/ATmin | 23.60 | Σ\|f/fi\| × Fno | 2.82 |
| CTmax/CTmin | 2.92 | f²/(R1 × R2) | 0.17 |
| TL/f | 1.42 | f²/(R3 × R4) | 4.24 |
| BL/f | 0.28 | f²/(R5 × R6) | 0.0046 |
| TD/ImgH | 1.26 | f²/(R7 × R8) | 0.74 |
| R10/f | −1.05 | f²/(R9 × R10) | 0.27 |
| R5/R9 | −4.31 | f²/(R11 × R12) | 0.00 |
| R14/T67 | 8.35 | f²/(R13 × R14) | 11.05 |
| f/R12 | 0.00 | (\|P3\| + \|P4\| + \|P5\| + \|P6\|)/ (\|P1\| + \|P2\| + \|P7\|) | 0.26 |
| f/EPD | 1.57 | TD/SD | 1.10 |
| Σ\|f/fi\| | 1.798 | Yp7x/f, x = 1 | 0.15 |
| \|f/f1\| | 0.967 | Yp7x/f, x = 2 | 0.18 |
| \|f/f2\| | 0.455 | — | — |

7th Embodiment

Figure 13:
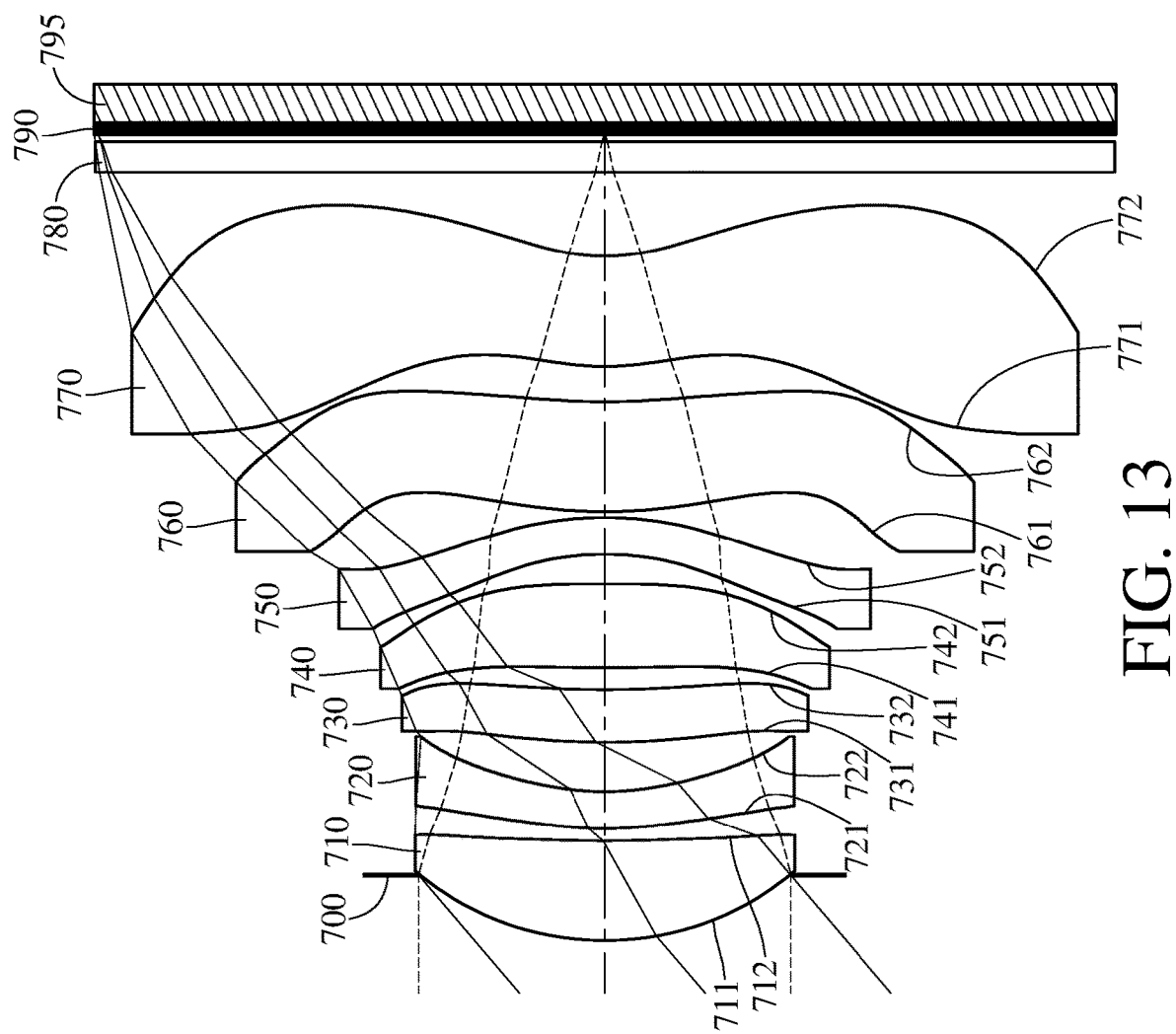
FIG. 13 is a schematic view of an image capturing unit according to the 7th embodiment of the present disclosure.
Figure 14:
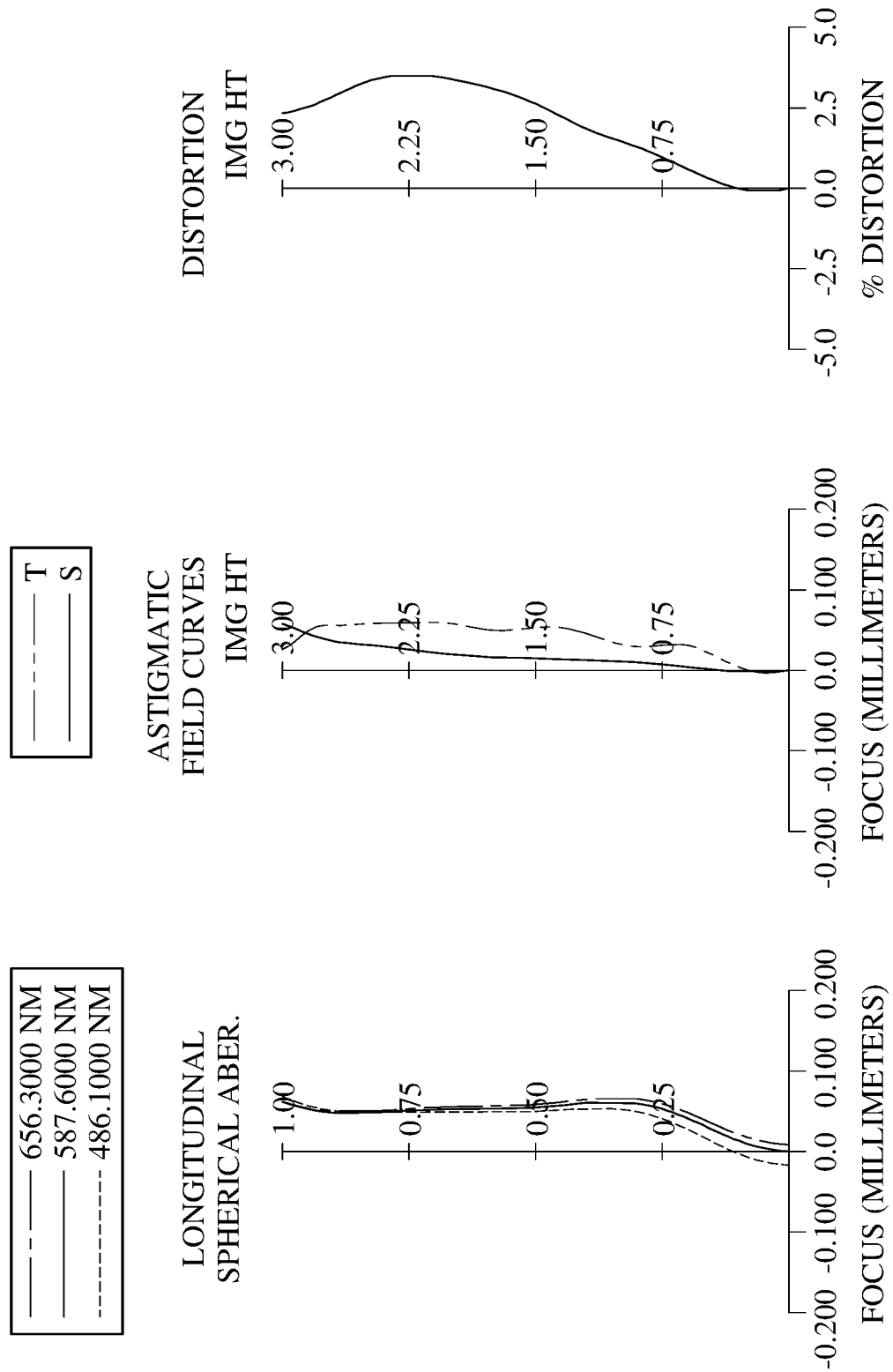
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical photographing lens assembly (its reference numeral is omitted) of the present disclosure and an image sensor 795. The optical photographing lens assembly includes, in order from an object side to an image side, an aperture stop 700, a first lens element 710, a second lens element 720, a third lens element 730, a fourth lens element 740, a fifth lens element 750, a sixth lens element 760, a seventh lens element 770, a filter 780 and an image surface 790. The optical photographing lens assembly includes seven single and non-cemented lens elements (710, 720, 730, 740, 750, 760 and 770) with no additional lens element disposed between each of the adjacent seven lens elements, wherein there is an air gap in a paraxial region between every adjacent lens element.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric.

The fourth lens element 740 with positive refractive power has an object-side surface 741 being convex in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with negative refractive power has an object-side surface 751 being concave in a paraxial region thereof and an image-side surface 752 being convex in a paraxial region thereof. The fifth lens element 750 is made of plastic material and has the object-side surface 751 and the image-side surface 752 being both aspheric.

The sixth lens element 760 with positive refractive power has an object-side surface 761 being convex in a paraxial region thereof and an image-side surface 762 being concave in a paraxial region thereof. The sixth lens element 760 is made of plastic material and has the object-side surface 761 and the image-side surface 762 being both aspheric. The image-side surface 762 of the sixth lens element 760 has at least one critical point. Each of the object-side surface 761 and the image-side surface 762 of the sixth lens element 760 has at least one inflection point.

The seventh lens element 770 with negative refractive power has an object-side surface 771 being convex in a paraxial region thereof and an image-side surface 772 being concave in a paraxial region thereof. The seventh lens element 770 is made of plastic material and has the object-side surface 771 and the image-side surface 772 being both aspheric. Each of the object-side surface 771 and the image-side surface 772 of the seventh lens element 770 has at least one inflection point.

The filter 780 is made of glass material and located between the seventh lens element 770 and the image surface 790, and will not affect the focal length of the optical photographing lens assembly. The image sensor 795 is disposed on or near the image surface 790 of the optical photographing lens assembly.

In this embodiment, there are a total of seven inflection points on the object-side surface 761 and the image-side surface 762 of the sixth lens element 760, and the object-side surface 771 and the image-side surface 772 of the seventh lens element 770.

The detailed optical data of the 7th embodiment are shown in Table 13 and the aspheric surface data are shown in Table 14 below.

TABLE 13

7th Embodiment
f = 3.41 mm, Fno = 1.55, HFOV = 40.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.385 | | | | |
| 2 | Lens 1 | 1.765 | (ASP) | 0.590 | Plastic | 1.545 | 56.0 | 4.17 |
| 3 | | 6.982 | (ASP) | 0.074 | | | | |
| 4 | Lens 2 | 2.173 | (ASP) | 0.220 | Plastic | 1.660 | 20.4 | −10.87 |
| 5 | | 1.601 | (ASP) | 0.293 | | | | |

TABLE 13-continued

7th Embodiment
f = 3.41 mm, Fno = 1.55, HFOV = 40.5 deg.

| Surface # | | Curvature Radius | | Thickness | Material | Index | Abbe # | Focal Length |
|---|---|---|---|---|---|---|---|---|
| 6 | Lens 3 | 4.314 | (ASP) | 0.312 | Plastic | 1.544 | 55.9 | 28.11 |
| 7 | | 5.858 | (ASP) | 0.129 | | | | |
| 8 | Lens 4 | 10.075 | (ASP) | 0.496 | Plastic | 1.544 | 55.9 | 12.90 |
| 9 | | −22.687 | (ASP) | 0.175 | | | | |
| 10 | Lens 5 | −1.899 | (ASP) | 0.220 | Plastic | 1.614 | 26.0 | −31.79 |
| 11 | | −2.196 | (ASP) | 0.035 | | | | |
| 12 | Lens 6 | 3.046 | (ASP) | 0.649 | Plastic | 1.544 | 55.9 | 32.11 |
| 13 | | 3.413 | (ASP) | 0.209 | | | | |
| 14 | Lens 7 | 1.518 | (ASP) | 0.655 | Plastic | 1.511 | 56.8 | −23.22 |
| 15 | | 1.149 | (ASP) | 0.500 | | | | |
| 16 | Filter | Plano | | 0.180 | Glass | 1.517 | 64.2 | — |
| 17 | | Plano | | 0.041 | | | | |
| 18 | Image | Plano | | — | | | | |

Note:
Reference wavelength is 587.6 nm (d-line).

TABLE 14

Aspheric Coefficients

| | Surface # | | | | |
|---|---|---|---|---|---|
| | 2 | 3 | 4 | 5 | 6 |
| k = | 1.8056E−01 | −8.6773E+01 | −1.7671E+01 | −1.1352E+01 | −1.9886E+01 |
| A4 = | −2.9218E−02 | −1.6051E−01 | −1.6068E−01 | 1.0231E−01 | −2.4554E−02 |
| A6 = | 1.6301E−01 | 4.5348E−01 | 3.6675E−01 | −2.3311E−01 | 8.8521E−02 |
| A8 = | −4.6581E−01 | −6.6245E−01 | −3.6293E−01 | 7.2110E−01 | −2.3104E−01 |
| A10 = | 7.5666E−01 | 5.3763E−01 | −8.4540E−03 | −1.2780E+00 | 2.7612E−01 |
| A12 = | −7.0032E−01 | −1.8973E−01 | 3.8849E−01 | 1.3079E+00 | −1.7586E−01 |
| A14 = | 3.4670E−01 | −1.7348E−02 | −3.5177E−01 | −7.1235E−01 | 1.4584E−02 |
| A16 = | −7.2000E−02 | 1.9898E−02 | 1.0130E−01 | 1.6297E−01 | 2.3137E−02 |

| | Surface # | | | | |
|---|---|---|---|---|---|
| | 7 | 8 | 9 | 10 | 11 |
| k = | −3.9509E+01 | −6.2557E+01 | 9.0000E+01 | 7.9239E−01 | −7.6371E+00 |
| A4 = | −2.8890E−02 | −1.0482E−01 | −2.6262E−01 | −2.2017E−01 | −1.4974E−01 |
| A6 = | −5.5893E−04 | 7.0707E−02 | 2.0428E−01 | 5.2864E−01 | 1.4895E−01 |
| A8 = | 8.6692E−02 | −7.3652E−02 | −1.3937E−01 | −4.0752E−01 | 5.4556E−02 |
| A10 = | −2.8423E−01 | −6.0343E−02 | 3.3336E−02 | 1.5028E−01 | −1.7946E−01 |
| A12 = | 3.4562E−01 | 1.7685E−01 | 5.1825E−02 | 9.6835E−03 | 1.2372E−01 |
| A14 = | −2.1279E−01 | −1.2437E−01 | −4.7504E−02 | −3.0600E−02 | −3.6417E−02 |
| A16 = | 5.2422E−02 | 2.9240E−02 | 1.1812E−02 | 8.2514E−03 | 3.9875E−03 |

| | Surface # | | | |
|---|---|---|---|---|
| | 12 | 13 | 14 | 15 |
| k = | −3.8643E−01 | −9.0000E+01 | −3.3476E+00 | −1.4514E+00 |
| A4 = | 1.2855E−03 | −2.7268E−02 | −4.2711E−01 | −2.8779E−01 |
| A6 = | −1.2876E−01 | 2.8473E−02 | 2.7473E−01 | 1.6669E−01 |
| A8 = | 1.3028E−01 | −1.8201E−02 | −1.0774E−01 | −6.1797E−02 |
| A10 = | −7.8183E−02 | 2.8164E−03 | 2.7041E−02 | 1.4136E−02 |
| A12 = | 2.1858E−02 | 1.6589E−04 | −4.1053E−03 | −1.9165E−03 |
| A14 = | −2.1842E−03 | −4.6742E−05 | 3.4086E−04 | 1.3963E−04 |
| A16 = | — | — | −1.1884E−05 | −4.1909E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 3.41 | |f/f3| | 0.121 |
| Fno | 1.55 | |f/f4| | 0.264 |

-continued

| 7th Embodiment | | | |
|---|---|---|---|
| HFOV [deg.] | 40.5 | \|f/f5\| | 0.107 |
| Vmin | 20.4 | \|f/f6\| | 0.106 |
| (V2 + V4 + V5)/3 | 34.10 | \|f/f7\| | 0.147 |
| ATmax/ATmin | 8.37 | Σ\|f/fi\| × Fno | 2.91 |
| CTmax/CTmin | 2.98 | $f^2$/(R1 × R2) | 0.94 |
| TL/f | 1.40 | $f^2$/(R3 × R4) | 3.34 |
| BL/f | 0.21 | $f^2$/(R5 × R6) | 0.46 |
| TD/ImgH | 1.35 | $f^2$/(R7 × R8) | −0.05 |
| R10/f | −0.64 | $f^2$/(R9 × R10) | 2.79 |
| R5/R9 | −2.27 | $f^2$/(R11 × R12) | 1.12 |
| R14/T67 | 5.50 | $f^2$/(R13 × R14) | 6.67 |
| f/R12 | 1.00 | (\|P3\| + \|P4\| + \|P5\| + \|P6\|)/(\|P1\| + \|P2\| + \|P7\|) | 0.47 |
| f/EPD | 1.55 | TD/SD | 1.10 |
| Σ\|f/fi\| | 1.878 | Yp7x/f, x = 1 | 0.11 |
| \|f/f1\| | 0.818 | Yp7x/f, x = 2 | 0.18 |
| \|f/f2\| | 0.314 | — | — |

8th Embodiment

Figure 15:
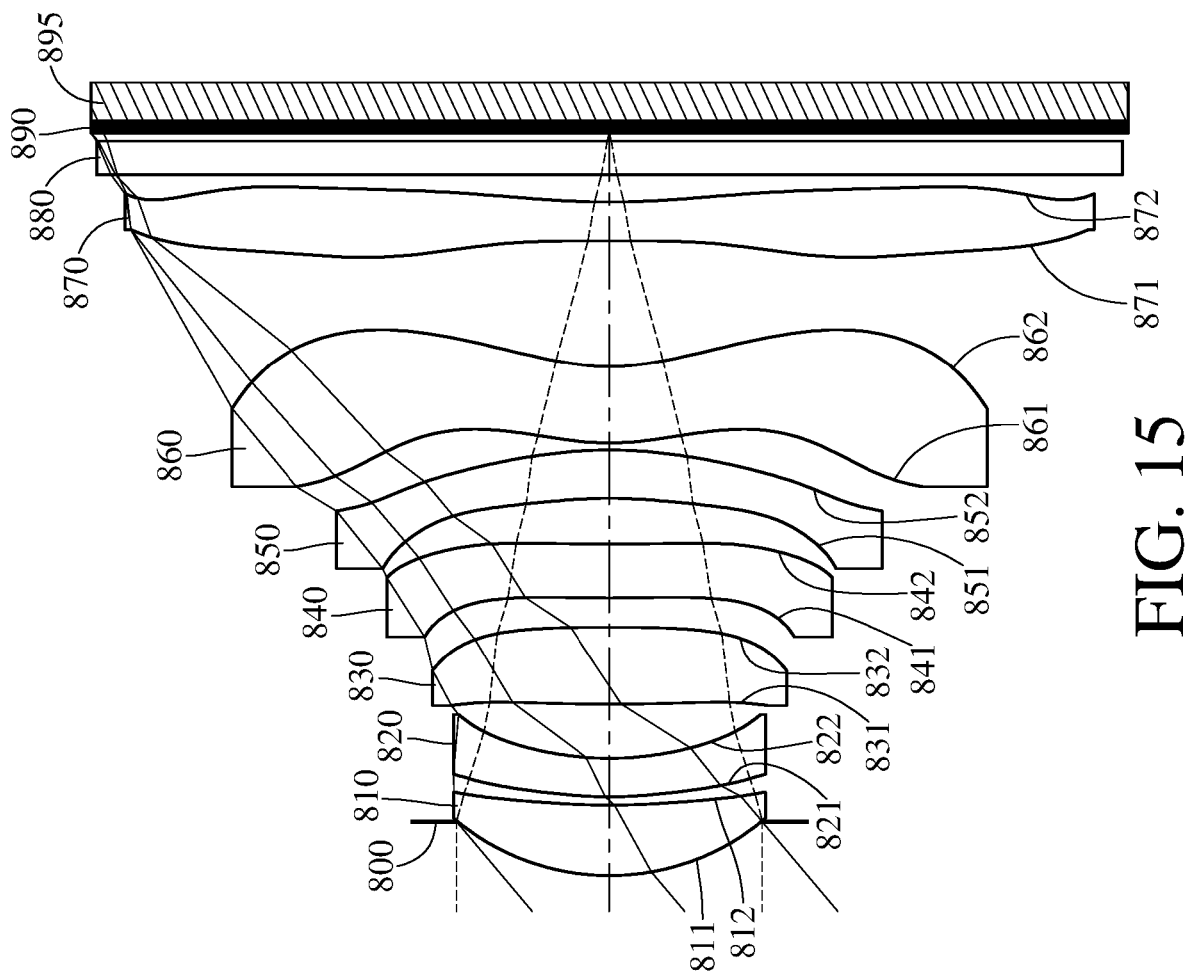
FIG. 15 is a schematic view of an image capturing unit according to the 8th embodiment of the present disclosure.
Figure 16:
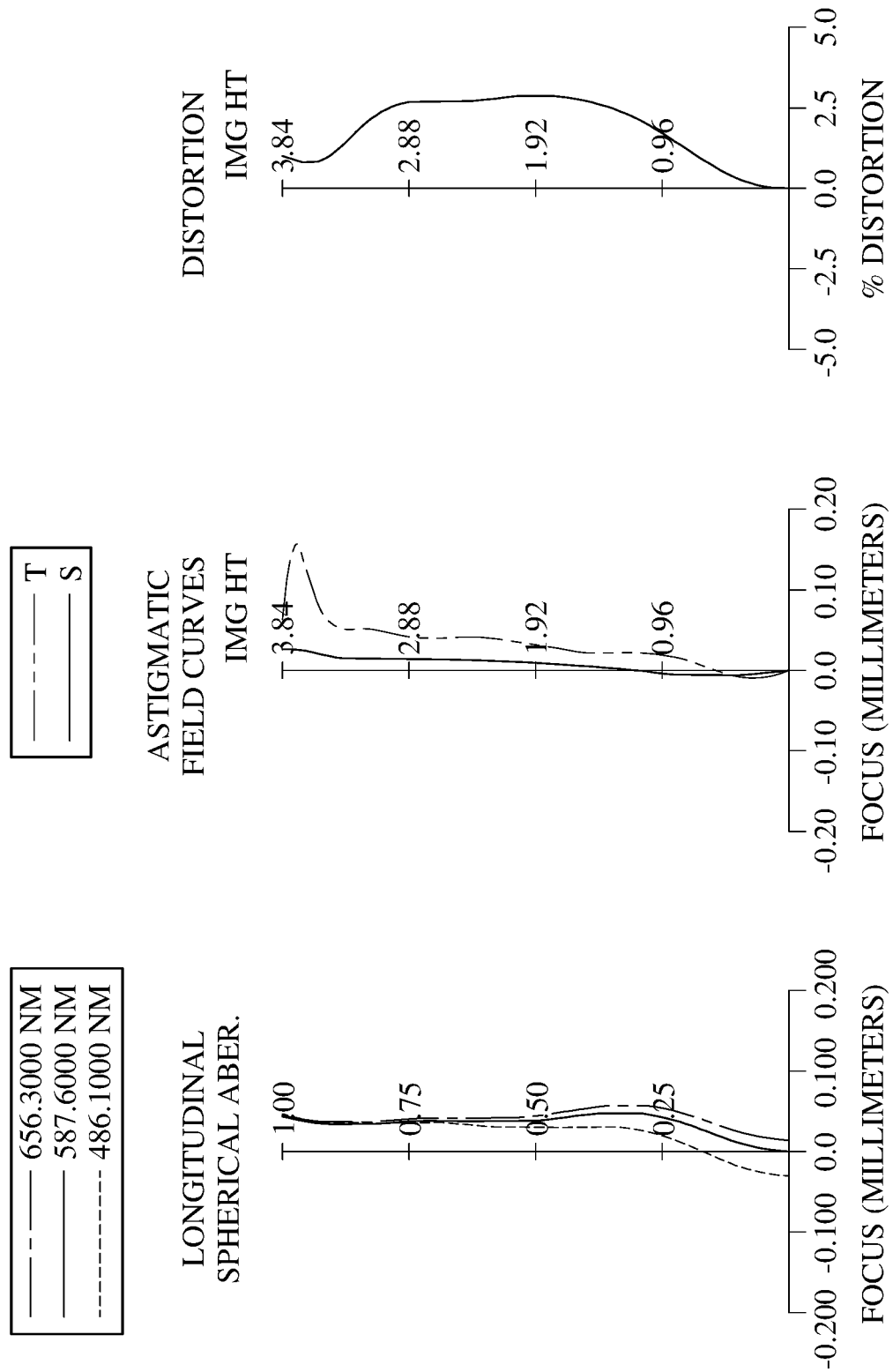
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical photographing lens assembly (its reference numeral is omitted) of the present disclosure and an image sensor 895. The optical photographing lens assembly includes, in order from an object side to an image side, an aperture stop 800, a first lens element 810, a second lens element 820, a third lens element 830, a fourth lens element 840, a fifth lens element 850, a sixth lens element 860, a seventh lens element 870, a filter 880 and an image surface 890. The optical photographing lens assembly includes seven single and non-cemented lens elements (810, 820, 830, 840, 850, 860 and 870) with no additional lens element disposed between each of the adjacent seven lens elements, wherein there is an air gap in a paraxial region between every adjacent lens element.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric.

The second lens element 820 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with positive refractive power has an object-side surface 831 being convex in a paraxial region thereof and an image-side surface 832 being convex in a paraxial region thereof. The third lens element 830 is made of plastic material and has the object-side surface 831 and the image-side surface 832 being both aspheric.

The fourth lens element 840 with negative refractive power has an object-side surface 841 being convex in a paraxial region thereof and an image-side surface 842 being concave in a paraxial region thereof. The fourth lens element 840 is made of plastic material and has the object-side surface 841 and the image-side surface 842 being both aspheric.

The fifth lens element 850 with positive refractive power has an object-side surface 851 being concave in a paraxial region thereof and an image-side surface 852 being convex in a paraxial region thereof. The fifth lens element 850 is made of plastic material and has the object-side surface 851 and the image-side surface 852 being both aspheric.

The sixth lens element 860 with positive refractive power has an object-side surface 861 being convex in a paraxial region thereof and an image-side surface 862 being concave in a paraxial region thereof. The sixth lens element 860 is made of plastic material and has the object-side surface 861 and the image-side surface 862 being both aspheric. The image-side surface 862 of the sixth lens element 860 has at least one critical point. Each of the object-side surface 861 and the image-side surface 862 of the sixth lens element 860 has at least one inflection point.

The seventh lens element 870 with negative refractive power has an object-side surface 871 being concave in a paraxial region thereof and an image-side surface 872 being concave in a paraxial region thereof. The seventh lens element 870 is made of plastic material and has the object-side surface 871 and the image-side surface 872 being both aspheric. Each of the object-side surface 871 and the image-side surface 872 of the seventh lens element 870 has at least one inflection point.

The filter 880 is made of glass material and located between the seventh lens element 870 and the image surface 890, and will not affect the focal length of the optical photographing lens assembly. The image sensor 895 is disposed on or near the image surface 890 of the optical photographing lens assembly.

In this embodiment, there are a total of ten inflection points on the object-side surface 861 and the image-side surface 862 of the sixth lens element 860, and the object-side surface 871 and the image-side surface 872 of the seventh lens element 870.

The detailed optical data of the 8th embodiment are shown in Table 15 and the aspheric surface data are shown in Table 16 below.

TABLE 15

8th Embodiment
f = 4.48 mm, Fno = 1.98, HFOV = 40.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.398 | | | | |
| 2 | Lens 1 | 1.795 | (ASP) | 0.521 | Plastic | 1.545 | 56.1 | 5.02 |
| 3 | | 4.690 | (ASP) | 0.062 | | | | |
| 4 | Lens 2 | 2.978 | (ASP) | 0.285 | Plastic | 1.682 | 19.0 | −16.80 |
| 5 | | 2.272 | (ASP) | 0.401 | | | | |

TABLE 15-continued

8th Embodiment
f = 4.48 mm, Fno = 1.98, HFOV = 40.1 deg.

| Surface # | | Curvature Radius | | Thickness | Material | Index | Abbe # | Focal Length |
|---|---|---|---|---|---|---|---|---|
| 6 | Lens 3 | 12.698 | (ASP) | 0.573 | Plastic | 1.544 | 56.0 | 13.44 |
| 7 | | −16.974 | (ASP) | 0.218 | | | | |
| 8 | Lens 4 | 15.174 | (ASP) | 0.398 | Plastic | 1.614 | 26.0 | −1207.76 |
| 9 | | 14.721 | (ASP) | 0.340 | | | | |
| 10 | Lens 5 | −3.099 | (ASP) | 0.357 | Plastic | 1.566 | 37.4 | 157.41 |
| 11 | | −3.120 | (ASP) | 0.052 | | | | |
| 12 | Lens 6 | 1.918 | (ASP) | 0.569 | Plastic | 1.544 | 56.0 | 628.68 |
| 13 | | 1.727 | (ASP) | 0.932 | | | | |
| 14 | Lens 7 | −196.078 | (ASP) | 0.287 | Plastic | 1.566 | 37.4 | −9.90 |
| 15 | | 5.775 | (ASP) | 0.202 | | | | |
| 16 | Filter | Plano | | 0.250 | Glass | 1.517 | 64.2 | — |
| 17 | | Plano | | 0.055 | | | | |
| 18 | Image | Plano | | — | | | | |

Note:
Reference wavelength is 587.6 nm (d-line).

TABLE 16

Aspheric Coefficients

| | Surface # | | | | |
|---|---|---|---|---|---|
| | 2 | 3 | 4 | 5 | 6 |
| k = | 3.7738E−02 | −1.6812E+01 | −1.8930E+01 | −3.6818E+00 | −6.5669E+01 |
| A4 = | −8.4088E−03 | −1.0238E−01 | −6.5158E−02 | 4.4087E−03 | −2.4621E−02 |
| A6 = | 4.9409E−02 | 1.5757E−01 | 9.0377E−02 | −5.3667E−02 | 4.5579E−02 |
| A8 = | −1.4611E−01 | −1.0232E−01 | 5.4268E−02 | 3.8537E−01 | −1.7395E−01 |
| A10 = | 2.4947E−01 | 3.2351E−02 | −2.2893E−01 | −7.5009E−01 | 3.1376E−01 |
| A12 = | −2.4023E−01 | −2.9478E−02 | 2.4704E−01 | 7.7087E−01 | −3.2059E−01 |
| A14 = | 1.2153E−01 | 4.0219E−02 | −1.1585E−01 | −3.9858E−01 | 1.6704E−01 |
| A16 = | −2.5095E−02 | −1.6342E−02 | 1.8968E−02 | 8.2037E−02 | −3.4208E−02 |

| | Surface # | | | | |
|---|---|---|---|---|---|
| | 7 | 8 | 9 | 10 | 11 |
| k = | −9.0000E+01 | 2.6044E+00 | −1.9903E+01 | −6.2567E+01 | 1.0937E+00 |
| A4 = | −6.3449E−02 | −9.6345E−02 | −4.9032E−02 | 3.0601E−02 | 8.5046E−02 |
| A6 = | 7.4695E−02 | 1.4774E−01 | 3.8449E−02 | −7.2214E−02 | −1.1306E−01 |
| A8 = | −2.1507E−01 | −3.1875E−01 | −6.4996E−02 | 6.4943E−02 | 1.1424E−01 |
| A10 = | 2.7232E−01 | 3.5542E−01 | 4.5282E−02 | −3.9167E−02 | −6.6027E−02 |
| A12 = | −1.9836E−01 | −2.2900E−01 | −1.4929E−02 | 8.7984E−03 | 2.0769E−02 |
| A14 = | 7.4662E−02 | 7.9614E−02 | 2.4179E−03 | 6.9044E−04 | −3.2909E−03 |
| A16 = | −1.1405E−02 | −1.1906E−02 | −1.8291E−04 | −3.7550E−04 | 2.0717E−04 |

| | Surface # | | | |
|---|---|---|---|---|
| | 12 | 13 | 14 | 15 |
| k = | −1.3226E+01 | −9.2143E+00 | −9.0000E+01 | −1.1613E+01 |
| A4 = | −7.9539E−02 | −1.7805E−02 | −7.3531E−02 | −2.6774E−02 |
| A6 = | 1.7672E−02 | −2.6043E−03 | 3.9064E−02 | 5.8123E−03 |
| A8 = | −7.6331E−03 | 2.6436E−03 | −8.9986E−03 | −5.2214E−04 |
| A10 = | 2.3328E−03 | −1.0232E−03 | 1.1255E−03 | 1.7037E−05 |
| A12 = | −2.3816E−04 | 1.9823E−04 | −7.9648E−05 | −1.1261E−06 |
| A14 = | −4.7231E−06 | −1.8939E−05 | 3.0099E−06 | 1.5125E−07 |
| A16 = | 1.3861E−06 | 7.0118E−07 | −4.7245E−08 | −5.3139E−09 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 4.48 | |f/f3| | 0.333 |
| Fno | 1.98 | |f/f4| | 0.004 |

-continued

| 8th Embodiment | | | |
|---|---|---|---|
| HFOV [deg.] | 40.1 | $|f/f5|$ | 0.028 |
| Vmin | 19.0 | $|f/f6|$ | 0.007 |
| (V2 + V4 + V5)/3 | 27.48 | $|f/f7|$ | 0.453 |
| ATmax/ATmin | 17.92 | $\Sigma|f/fi| \times Fno$ | 3.93 |
| CTmax/CTmin | 2.01 | $f^2/(R1 \times R2)$ | 2.39 |
| TL/f | 1.23 | $f^2/(R3 \times R4)$ | 2.97 |
| BL/f | 0.11 | $f^2/(R5 \times R6)$ | −0.09 |
| TD/ImgH | 1.30 | $f^2/(R7 \times R8)$ | 0.09 |
| R10/f | −0.70 | $f^2/(R9 \times R10)$ | 2.08 |
| R5/R9 | −4.10 | $f^2/(R11 \times R12)$ | 6.07 |
| R14/T67 | 6.20 | $f^2/(R13 \times R14)$ | −0.02 |
| f/R12 | 2.60 | (\|P3\| + \|P4\| + \|P5\| + \|P6\|)/(\|P1\| + \|P2\| + \|P7\|) | 0.23 |
| f/EPD | 1.98 | TD/SD | 1.09 |
| $\Sigma|f/fi|$ | 1.986 | Yp7x/f, x = 1 | 0.26 |
| $|f/f1|$ | 0.893 | Yp7x/f, x = 2 | 0.17 |
| $|f/f2|$ | 0.267 | — | — |

9th Embodiment

Figure 17:
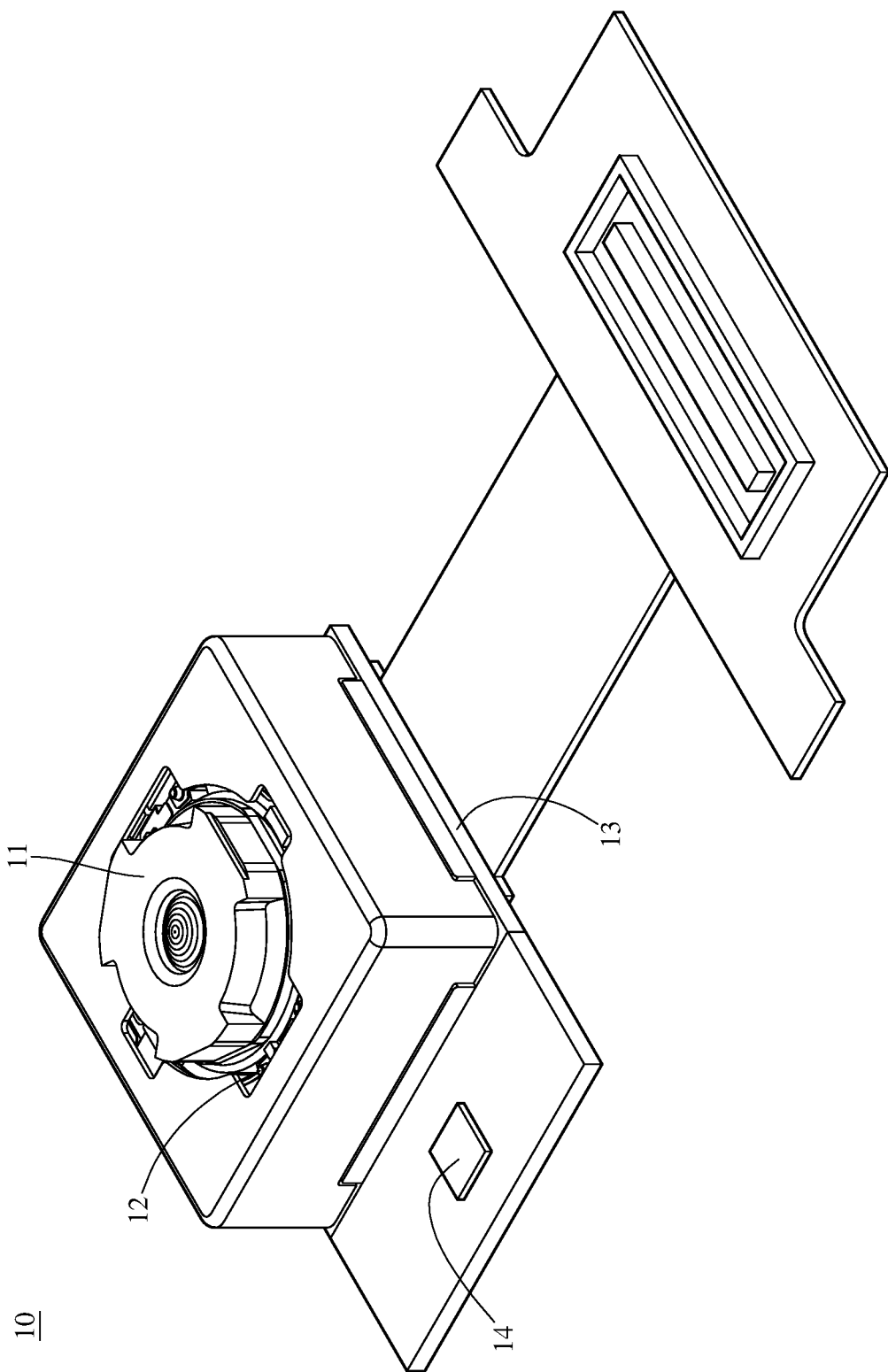
FIG. 17 is a perspective view of an image capturing unit according to the 9th embodiment of the present disclosure.

FIG. 17 is a perspective view of an image capturing unit according to the 9th embodiment of the present disclosure. In this embodiment, an image capturing unit 10 is a camera module including a lens unit 11, a driving device 12, an image sensor 13 and an image stabilizer 14. The lens unit 11 includes the optical photographing lens assembly disclosed in the 1st embodiment, a barrel and a holder member (their reference numerals are omitted) for holding the optical photographing lens assembly. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the optical photographing lens assembly to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

10th Embodiment

Figure 18:
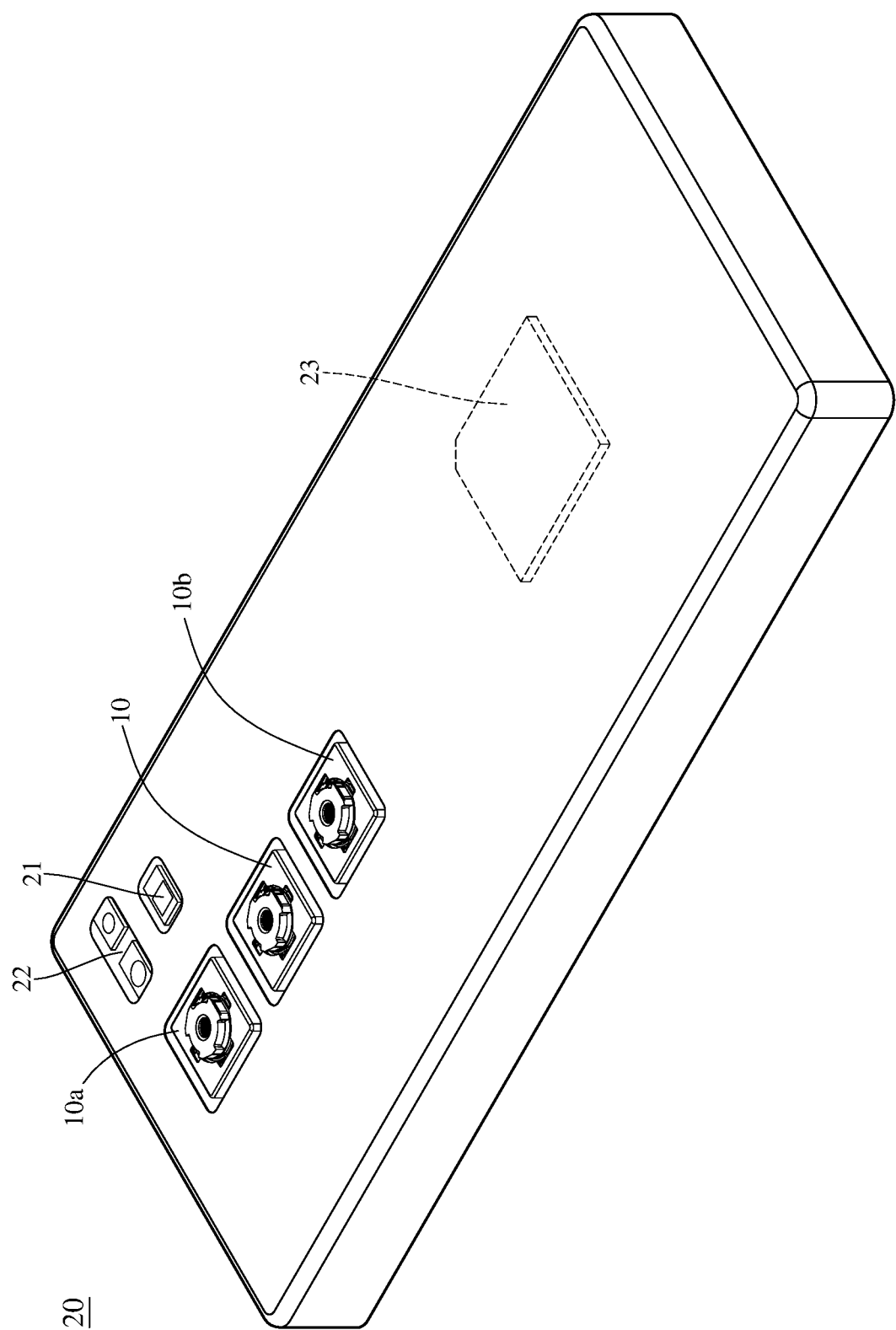
FIG. 18 is one perspective view of an electronic device according to the 10th embodiment of the present disclosure.
Figure 19:
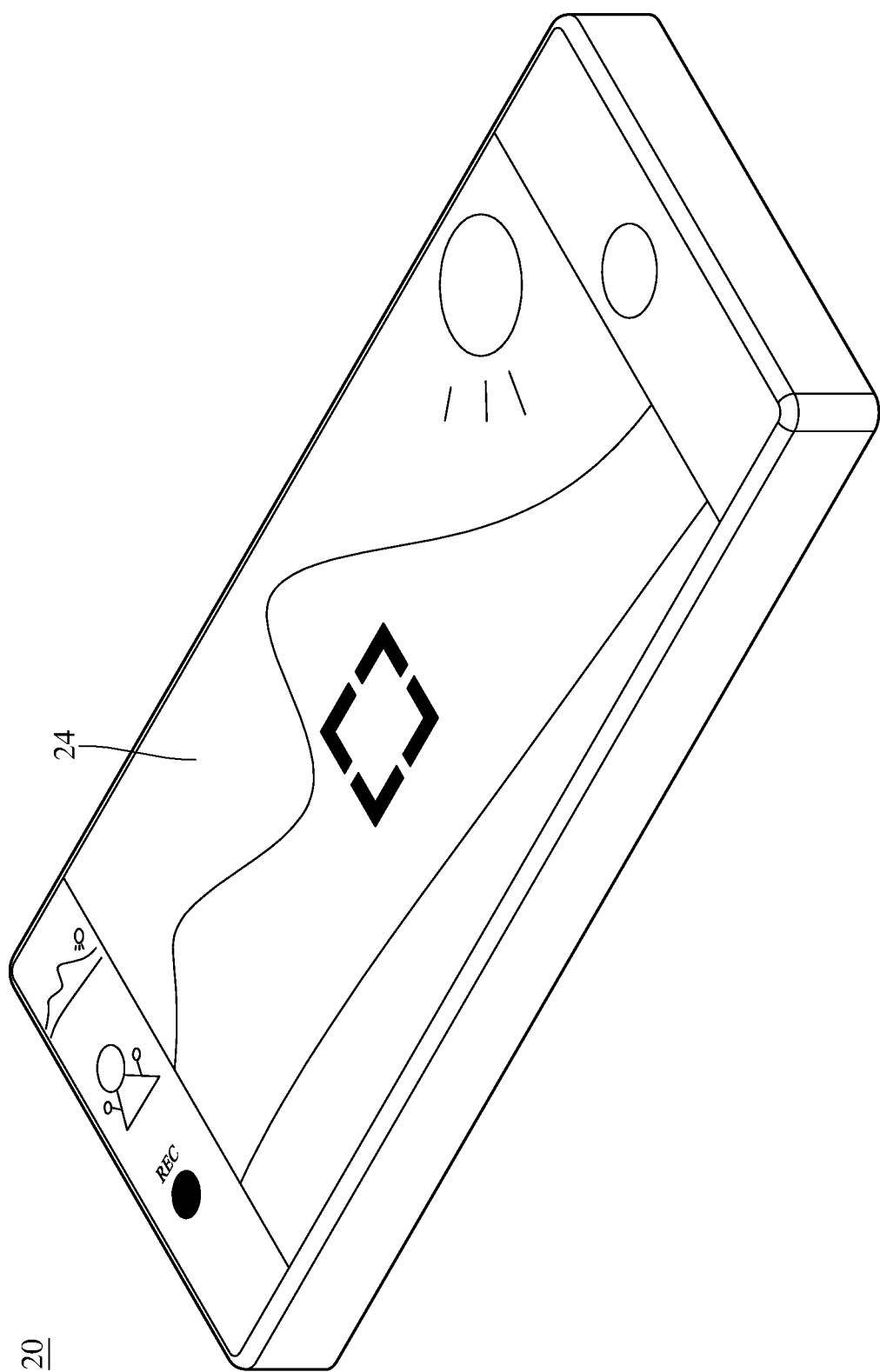
FIG. 19 is another perspective view of the electronic device in FIG. 18.
Figure 20:
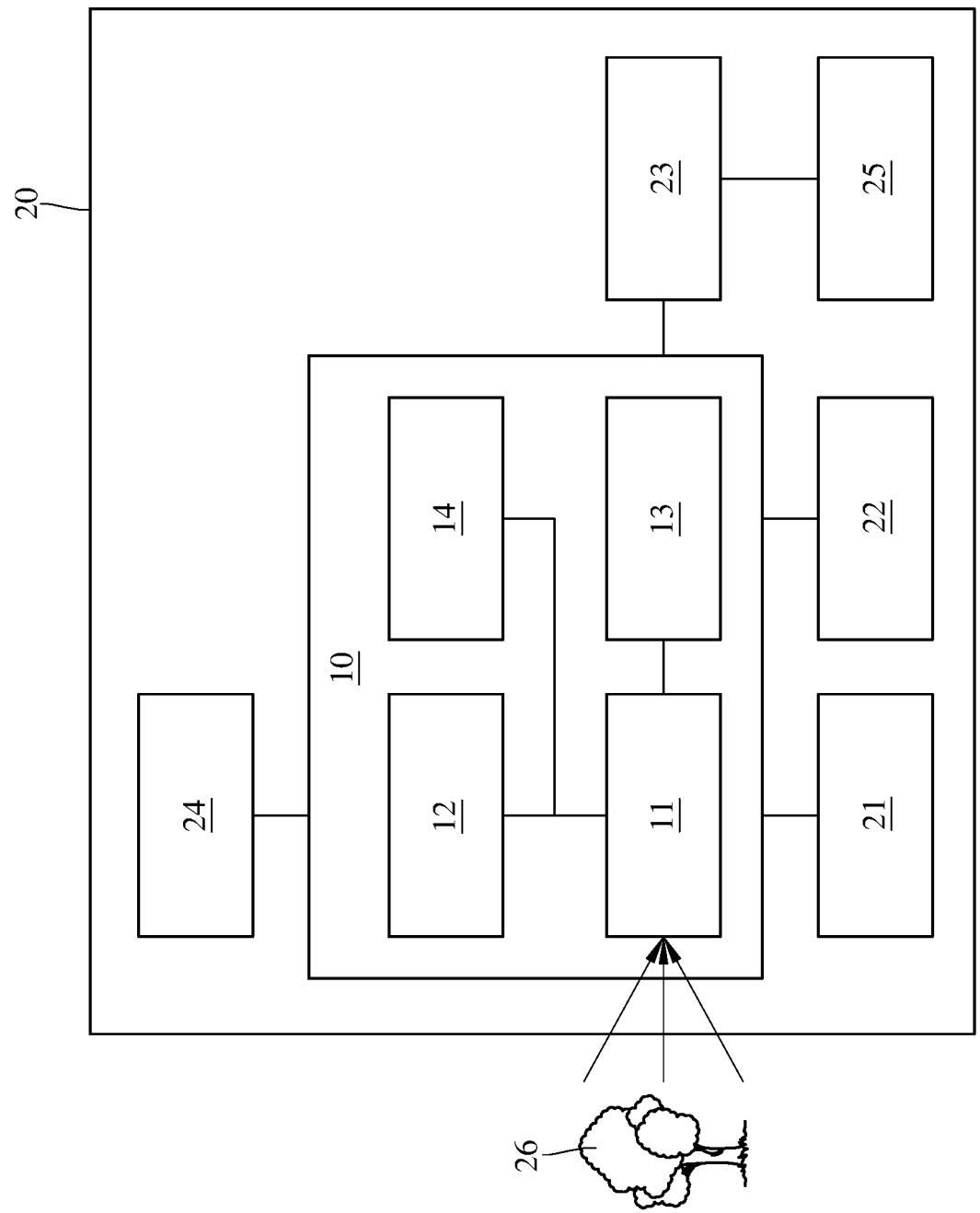
FIG. 20 is a block diagram of the electronic device in FIG. 18.

FIG. 18 is one perspective view of an electronic device according to the 10th embodiment of the present disclosure. FIG. 19 is another perspective view of the electronic device in FIG. 18. FIG. 20 is a block diagram of the electronic device in FIG. 18. In this embodiment, an electronic device 20 is a smartphone including the image capturing unit 10 disclosed in the 9th embodiment, a flash module 21, a focus assist module 22, an image signal processor 23, a user interface 24, an image software processor 25 and two additional image capturing units 10a, 10b. The image capturing unit 10, the image capturing unit 10a and the image capturing unit 10b all face the same direction and each has a single focal point. The image capturing units 10, 10a, 10b have different fields of view to meet various photography requirements, such as wide viewing angle and telephoto effect. In this embodiment, the electronic device 20 includes multiple image capturing units, but the present disclosure is not limited to the number of image capturing units.

When a user captures images of an object 26 through the user interface 24, the light rays converge in the image capturing unit 10 to generate an image, and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. The user interface 24 can be a touch screen or a physical button. The user is able to interact with the user interface 24 and the image software processor 25 having multiple functions to capture images and complete image processing.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the optical photographing lens assembly of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical photographing lens assembly comprising seven lens elements, the seven lens elements being, in order from an object side to an image side, a first lens element, a second lens element, a third lens element, a fourth lens element, a fifth lens element, a sixth lens element and a seventh lens element; at least one surface among object-side surfaces and image-side surfaces of the seven lens elements being aspheric;
   wherein the optical photographing lens assembly has a total of seven lens elements, the optical photographing lens assembly further comprises an aperture stop, at least one of an object-side surface and an image-side surface of the seventh lens element has at least one inflection point, a focal length of the optical photographing lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, a focal length of the i-th lens element is fi, an axial distance between an object-side surface of the first lens element and an image surface is TL, a minimum value among all Abbe numbers of the seven lens elements of the optical photographing lens assembly is Vmin, an axial distance between the object-side surface of the first lens element and the image-side surface of the seventh lens element is TD, an axial distance between the aperture stop and the image-side surface of the seventh lens element is SD, and the following conditions are satisfied:

$\Sigma |f/fi| < 2.20$, wherein $i=1,2,3,4,5,6,7$;

$0.50 < TL/f < 3.50$;

$10.0 < Vmin < 19.5$; and $0.80 < TD/SD < 1.30$.

2. The optical photographing lens assembly of claim 1, wherein the first lens element has an image-side surface being concave in a paraxial region thereof.

3. The optical photographing lens assembly of claim 2, wherein the second lens element has an image-side surface being concave in a paraxial region thereof, the image-side surface of the seventh lens element is concave in a paraxial region thereof, and the image-side surface of the seventh lens element has at least one convex shape in an off-axis region thereof.

4. The optical photographing lens assembly of claim 1, wherein there are a total of at least nine inflection points on object-side surfaces and image-side surfaces of the sixth lens element and the seventh lens element, the focal length of the optical photographing lens assembly is f, a curvature radius of the image-side surface of the sixth lens element is R12, and the following condition is satisfied:

$0 \leq f/R12 < 5.0$.

5. The optical photographing lens assembly of claim 1, wherein the first lens element has positive refractive power, the focal length of the optical photographing lens assembly is f, an entrance pupil diameter of the optical photographing lens assembly is EPD, and the following condition is are satisfied:

$0.50 < f/EPD < 2.0$.

6. The optical photographing lens assembly of claim 1, wherein the focal length of the optical photographing lens assembly is f, the focal length of the first lens element is f1, the focal length of the second lens element is f2, the focal length of the third lens element is f3, the focal length of the fourth lens element is f4, the focal length of the fifth lens element is f5, the focal length of the sixth lens element is f6, the focal length of the seventh lens element is f7, the focal length of the i-th lens element is fi, and the following condition is satisfied:

$1.0 < \Sigma |f/fi| < 2.10$, wherein $i=1,2,3,4,5,6,7$;

a curvature radius of an object-side surface of one lens element of the seven lens elements is Ra, a curvature radius of an image-side surface of the lens element of the seven lens elements is Rb, and at least six of the seven lens elements satisfy the following condition:

$0 \leq f^2/(Ra \times Rb)$.

7. The optical photographing lens assembly of claim 1, wherein refractive power of the first lens element and refractive power of the second lens element are two strongest among all refractive power of the seven lens elements, the axial distance between the object-side surface of the first lens element and the image surface is TL, the focal length of the optical photographing lens assembly is f, and the following condition is satisfied:

$0.50 < TL/f < 2.50$.

8. The optical photographing lens assembly of claim 1, wherein a curvature radius of an object-side surface of the third lens element is R5, a curvature radius of an object-side surface of the fifth lens element is R9, and the following condition is satisfied:

$R5/R9 < 1.50$.

9. The optical photographing lens assembly of claim 1, wherein a curvature radius of the image-side surface of the seventh lens element is R14, an axial distance between the sixth lens element and the seventh lens element is T67, and the following condition is satisfied:

$1.0 < R14/T67 < 9.0$.

10. The optical photographing lens assembly of claim 1, wherein an Abbe number of the second lens element is V2, an Abbe number of the fourth lens element is V4, an Abbe number of the fifth lens element is V5, and the following condition is satisfied:

$10.0 < (V2+V4+V5)3 < 35.0$.

11. The optical photographing lens assembly of claim 1, wherein the focal length of the optical photographing lens assembly is f, the focal length of the first lens element is f1, the focal length of the second lens element is f2, the focal length of the third lens element is f3, the focal length of the fourth lens element is f4, the focal length of the fifth lens element is f5, the focal length of the sixth lens element is f6, the focal length of the seventh lens element is f7, the focal length of the i-th lens element is fi, and at least three of the seven lens elements satisfy the following condition:

$|f/fi| < 01.0$, wherein $i=1,2,3,4,5,6,7$.

12. The optical photographing lens assembly of claim 1, wherein each of the first through the seventh lens elements of the optical photographing lens assembly is a single and non-cemented lens element, an axial distance between the image-side surface of the seventh lens element and an image surface is BL, the focal length of the optical photographing lens assembly is f, and the following condition is satisfied:

$0.05 < BL/f < 0.50$.

13. The optical photographing lens assembly of claim 1, wherein a maximum value among all axial distances between every adjacent lens element of the optical photographing lens assembly is ATmax, a minimum value among all axial distances between every adjacent lens element of the optical photographing lens assembly is ATmin, the axial distance between the object-side surface of the first lens element and the image-side surface of the seventh lens element is TD, a maximum image height of the optical photographing lens assembly is ImgH, and the following conditions are satisfied:

$1.20 < ATmax/ATmin < 25.0$; and $0.70 < TD/ImgH < 1.80$.

14. An image capturing unit, comprising:
the optical photographing lens assembly of claim 1; and
an image sensor disposed on the image surface of the optical photographing lens assembly.

15. An electronic device, comprising:
the image capturing unit of claim 14.

16. A optical photographing lens assembly comprising seven lens elements, the seven lens elements being, in order from an object side to an image side, a first lens element, a second lens element, a third lens element, a fourth lens element, a fifth lens element, a sixth lens element and a seventh lens element; at least one surface among object-side surfaces and image-side surfaces of the seven lens elements being aspheric;
wherein the optical photographing lens assembly has a total of seven lens elements, the first lens element has positive refractive power, the seventh lens element with negative refractive power has an image-side surface being concave in a paraxial region thereof, the image-side surface of the seventh lens element has at least one convex shape in an off-axis region thereof, a focal length of the optical photographing lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, a focal length of the i-th lens element is fi, a curvature radius of an image-side surface of the fifth lens element is R10, a minimum value among all Abbe numbers of the seven lens elements of the optical photographing lens assembly is Vmin, and the following conditions are satisfied:

$\Sigma |f/fi| < 2.60$, wherein $i=1,2,3,4,5,6,7$;

$R10/f < 1.30$; and $10.0 < Vmin < 19.5$.

17. The optical photographing lens assembly of claim 16, wherein the focal length of the optical photographing lens assembly is f, a curvature radius of an image-side surface of the sixth lens element is R12, a vertical distance between an inflection point closest to an optical axis on surfaces of the seventh lens element and the optical axis is Yp7x, and the following conditions are satisfied:

$0 \leq f/R12 < 3.50$; and $0.03 < Yp7x/f < 1.0$.

18. The optical photographing lens assembly of claim 16, wherein the first lens element has an object-side surface being convex in a paraxial region thereof, and the third lens element has an object-side surface being convex in a paraxial region thereof.

19. The optical photographing lens assembly of claim 16, wherein an image-side surface of the sixth lens element has at least one non-axial critical point.

20. The optical photographing lens assembly of claim 16, wherein the curvature radius of the image-side surface of the fifth lens element is R10, the focal length of the optical photographing lens assembly is f, and the following condition is satisfied:

$-9.0 < R10/f < 1.30$.

21. The optical photographing lens assembly of claim 16, wherein a curvature radius of an object-side surface of the third lens element is R5, a curvature radius of an object-side surface of the fifth lens element is R9, and the following condition is satisfied:

$-9.0 < R5/R9 < 0.50$.

22. The optical photographing lens assembly of claim 16, wherein a curvature radius of the image-side surface of the seventh lens element is R14, an axial distance between the sixth lens element and the seventh lens element is T67, and the following condition is satisfied:

$1.0 < R14/T67 < 9.0$.

23. The optical photographing lens assembly of claim 16, wherein half of a maximum field of view of the optical photographing lens assembly is HFOV, the focal length of the optical photographing lens assembly is f, the focal length of the first lens element is f1, the focal length of the second lens element is f2, the focal length of the third lens element is f3, the focal length of the fourth lens element is f4, the focal length of the fifth lens element is f5, the focal length of the sixth lens element is f6, the focal length of the seventh lens element is f7, the focal length of the i-th lens element is fi, an f-number of the optical photographing lens assembly is Fno, and the following conditions are satisfied:

$40.0[deg.] < HFOV < 80.0[deg.]$; and $1.0 < \Sigma |f/fi| \times Fno < 4.0$, wherein $i=1,2,3,4,5,6,7$.

24. A optical photographing lens assembly comprising seven lens elements, the seven lens elements being, in order from an object side to an image side, a first lens element, a second lens element, a third lens element, a fourth lens element, a fifth lens element, a sixth lens element and a seventh lens element; at least one surface among object-side surfaces and image-side surfaces of the seven lens elements being aspheric;
wherein the optical photographing lens assembly has a total of seven lens elements, the first lens element having positive refractive power, the second lens element has negative refractive power, the seventh lens element has an image-side surface being concave in a paraxial region thereof, the image-side surface of the seventh lens element has at least one convex shape in an off-axis region thereof, a focal length of the optical photographing lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the seventh lens element is f7, a focal length of the i-th lens element is fi, an axial distance between an object-side surface of the first lens element and the image-side surface of the seventh lens element is TD, a maximum image height of the optical photographing lens assembly is ImgH, a minimum value among all Abbe numbers of the seven lens elements of the optical photographing lens assembly is Vmin, and the following conditions are satisfied:

$\Sigma |f/fi| < 2.60$, wherein $i=1,2,3,4,5,6,7$;

$0.50 < TD/ImgH < 5.0$; and $10.0 < Vmin < 19.5$.

25. The optical photographing lens assembly of claim 24, wherein the first lens element has an image-side surface being concave in a paraxial region thereof, and the fifth lens element has an object-side surface being concave in a paraxial region thereof.

26. The optical photographing lens assembly of claim 24, wherein the focal length of the optical photographing lens assembly is f, the focal length of the first lens element is f1, the focal length of the second lens element is f2, the focal length of the third lens element is f3, the focal length of the fourth lens element is f4, the focal length of the fifth lens element is f5, the focal length of the sixth lens element is f6, the focal length of the seventh lens element is f7, the focal length of the i-th lens element is fi, a vertical distance between an inflection point closest to an optical axis on surfaces of the seventh lens element and the optical axis is Yp7x, and the following conditions are satisfied:

$1.0 < \Sigma |f/fi| < 2.1$, wherein $i=1,2,3,4,5,6,7$;

$0.05 < Yp7x/f < 0.80$.

27. The optical photographing lens assembly of claim 24, wherein a maximum value among all axial distances between every adjacent lens element of the optical photographing lens assembly is ATmax, a minimum value among all axial distances between every adjacent lens element of the optical photographing lens assembly is ATmin, a maximum value among all central thicknesses of the seven lens elements is CTmax, a minimum value among all central thicknesses of the seven lens elements is CTmin, and the following conditions are satisfied:

$1.20 < ATmax/ATmin < 25.0$; and $1.20 < CTmax/CTmin < 4.0$.

28. The optical photographing lens assembly of claim 24, wherein a curvature radius of an object-side surface of the third lens element is R5, a curvature radius of an object-side surface of the fifth lens element is R9, the focal length of the optical photographing lens assembly is f, an entrance pupil diameter of the optical photographing lens assembly is EPD, and the following conditions are satisfied:

$R5/R9 < 0.80$; and $1.0 < f/EPD < 1.90$.

29. The optical photographing lens assembly of claim 24, wherein at least six of the seven lens elements are meniscus in a paraxial region thereof, a refractive power of the first lens element is P1, a refractive power of the second lens element is P2, a refractive power of the third lens element is P3, a refractive power of the fourth lens element is P4, a refractive power of the fifth lens element is P5, a refractive power of the sixth lens element is P6, a refractive power of the seventh lens element is P7, and the following condition is satisfied:

$0.10 < (|P3|+|P4|+|P5|+|P6|)/(|P1|+|P2|+|P7|) < 1.50$.

* * * * *